United States Patent
Swann

(10) Patent No.: US 12,241,409 B2
(45) Date of Patent: Mar. 4, 2025

(54) AIRCRAFT PROPULSION SYSTEM

(71) Applicant: ROLLS-ROYCE plc, London (GB)

(72) Inventor: Peter Swann, Derby (GB)

(73) Assignee: ROLLS-ROYCE plc, London (GB)

( * ) Notice: Subject to any disclaimer, the term of this patent is extended or adjusted under 35 U.S.C. 154(b) by 166 days.

(21) Appl. No.: 18/164,858

(22) Filed: Feb. 6, 2023

(65) Prior Publication Data

US 2023/0279808 A1 Sep. 7, 2023

(30) Foreign Application Priority Data

Mar. 1, 2022 (GB) ...................................... 2202791

(51) Int. Cl.
*F02C 6/20* (2006.01)
*B64D 27/02* (2006.01)
(Continued)

(52) U.S. Cl.
CPC ................ *F02C 6/20* (2013.01); *B64D 27/02* (2013.01); *F02C 9/28* (2013.01); *F02C 9/42* (2013.01);
(Continued)

(58) Field of Classification Search
CPC ..... F02C 6/20; F02C 9/28; F02C 9/42; B64D 27/02; B64D 27/026; B64D 27/10;
(Continued)

(56) References Cited

U.S. PATENT DOCUMENTS 9,399,521 B2 * 7/2016 Swann ...................... F02C 9/16
10,435,165 B2 * 10/2019 Swann ...................... F02C 9/54
(Continued)

FOREIGN PATENT DOCUMENTS

GB 2 537 743 A 10/2016
GB 2 558 228 A 7/2018
(Continued)

OTHER PUBLICATIONS

Aug. 15, 2022 Search Report issued in British Patent Application No. GB2202791.6.
(Continued)

*Primary Examiner* — Valentina Xavier
(74) *Attorney, Agent, or Firm* — Oliff PLC

(57) ABSTRACT

An aircraft propulsion system includes first and second engines and first and second electrical machines coupled to the first and second engines respectively. The first electrical machine is arranged to be driven by electrical power in order to at least partially drive the first engine. The second electrical machine is arranged to be driven by the second engine to generate electrical power. An electrical network allows transmission of electrical power between the electrical machines. A controller is arranged to selectively reduce fuel flow to the first engine and provide electrical power from the second electrical machine to the first electrical machine to drive the first electrical machine, based on expected properties of contrails formed in an exhaust plume of the first engine and/or the second engine. The system allows the formation of contrails by the engines to be managed in order to mitigate climate-warming effects of the contrails.

16 Claims, 14 Drawing Sheets

(51) Int. Cl.
*F02C 9/28* (2006.01)
*F02C 9/42* (2006.01)

(52) U.S. Cl.
CPC ...... *B64D 27/026* (2024.01); *F05D 2220/323* (2013.01); *F05D 2220/76* (2013.01); *F05D 2270/08* (2013.01)

(58) Field of Classification Search
CPC .............. B64D 27/24; F05D 2220/323; F05D 2220/76; F05D 2270/08; Y02T 50/60
See application file for complete search history.

(56) References Cited

U.S. PATENT DOCUMENTS

| | | | |
|---|---|---|---|
| 2018/0354632 A1 | 12/2018 | Hon et al. | |
| 2019/0322379 A1 | 10/2019 | Mackin | |

FOREIGN PATENT DOCUMENTS

| | | | | |
|---|---|---|---|---|
| GB | 2558228 B | 5/2020 | | |
| WO | WO-2022212575 A1 * | 10/2022 | ............. | A01G 15/00 |

OTHER PUBLICATIONS

Ang et al., "Performance Analysis of an Electrically Assisted Propulsion System for a Short-Range Civil Aircraft," Journal of Aerospace Engineering, Institution of Mechanical Engineers, 2019, vol. 233, No. 4, pp. 1490-1502.
Jul. 6, 2023 Extended Search Report issued in European Patent Application No. 23154920.5.

* cited by examiner

AIRCRAFT PROPULSION SYSTEM

CROSS-REFERENCE TO RELATED PATENT APPLICATIONS

This application is based upon and claims the benefit of priority from United Kingdom Patent Application No. GB 2202791.6, filed on Mar. 1, 2022, the entire contents of which are herein incorporated by reference.

BACKGROUND OF THE INVENTION

Field of the Invention

This disclosure relates to an aircraft propulsion system and to a method for operating a propulsion system. In particular, but not exclusively, the present invention relates to an aircraft propulsion system in which electrical energy is used to supplement the operation of a combustion engine.

Description of Related Art

Contrails, also known as condensation trails or vapour trails, are line-shaped ice-clouds that appear behind aircraft under certain circumstances. The formation of a contrail depends on a number of factors, including: ambient temperature, humidity and pressure; the efficiency of the engines; and the properties of the fuel burned in the engines.

A contrail, once formed, will typically dissipate within a minute or so, unless the ambient air is supersaturated with respect to ice (i.e. having a relative humidity over ice (RHI) of more than 100%), in which case the contrail may persist. A persistent contrail will grow over time to resemble natural cirrus cloud, both in size and optical properties, and is referred to as "contrail-cirrus". Line-shaped contrails and contrail-cirrus are collectively referred to as "aviation-induced cloudiness" (AIC). Contrail-cirrus is thought to cause a majority of the climate impact of aviation induced cloudiness due to it being spatially-larger and longer-lived than non-persistent line-shaped contrails.

Depending on the metric employed, the climate-warming impact of aviation-induced cloudiness may be of a similar magnitude to that of the carbon dioxide emitted by aircraft, and may therefore represent a significant element of the total climate impact from aviation. The control of contrail formation and/or contrail properties, and particularly the reduction of the impact of persistent contrails, therefore, represents a compelling opportunity for a significant reduction in the overall climate warming impact of aviation.

Conventional propulsion systems for civil aircraft typically comprise one or more turbofan gas turbine engine placed under the wing of the aircraft or mounted on the fuselage.

Exhaust plumes of engines located sufficiently close to the wingtips of an aircraft will become at least partially entrained in the wingtip vortices of the aircraft. Contrail ice particles entrained in the vortices are subject to adiabatic heating due to descent of the vortex. As a result, ice mass can be lost from the surface of the entrained ice particles via sublimation, leading to elimination of some of the particles, thereby leading to a reduction in the optical depth of the contrail downstream of the vortex region. This effect is particularly evident on relatively large/heavy aircraft for which the wingtip vortices are strong in nature. This effect is less evident when ambient air is highly supersaturated with respect to ice.

In comparison with contrails produced by outboard engines, contrails produced by inboard engines interact less strongly with wingtip vortices, and contrails produced by engines mounted very close to the centreline of the aircraft interact much less strongly with the wingtip vortex cores. Hence there is a distinction between outboard and inboard engines, as far as interaction with wingtip vortices is concerned, particularly where the inboard engines are very close to the centreline of the aircraft. Exhaust plumes of outboard engines of a four-engine aircraft are more quickly and more effectively entrained into the trailing vortex than those of the inboard engines, or those of conventional two-engined aircraft.

Ice particles which survive the wingtip-vortex make up a contrail whose vertical extent is greatly increased, perhaps to several hundred metres, as a result of wingtip-vortex interaction. In the presence of ambient wind-shear, a vertically-large contrail can also spread laterally so as to cover a much larger amount of sky. Therefore, in some cases, the product of the contrail's optical depth and its width can be increased by the wingtip vortex interaction, while in others, it can be decreased by the wingtip vortex interaction due to the elimination of ice particles having a greater effect than spatial spreading. Therefore, depending on a number of conditions, entraining of the exhaust plume in the wingtip vortex may increase or reduce aviation induced cloudiness.

It is an object of the present disclosure to manage the formation of contrails by aircraft engines in a manner that reduces negative impact on the climate.

BRIEF SUMMARY

According to an example, there is provided an aircraft propulsion system comprising: at least two engines, each engine having: a propulsive fan and an engine core, the engine core comprising a compressor, a combustor and a turbine driven by a flow of combustion products from the combustor, the propulsive fan configured to generate a mass flow of air that bypasses the engine core to generate thrust; a first electrical machine coupled to a first engine, the first electrical machine arranged to be driven by electrical power in order to at least partially drive the first engine; a second electrical machine coupled to a second engine, the second electrical machine arranged to be driven by the second engine to generate electrical power; an electrical network arranged to allow transmission of electrical power between the first electrical machine and the second electrical machine; and a controller arranged to, based on expected properties of contrails formed in an exhaust plume of the first engine and/or second engine, selectively reduce fuel flow to the first engine, and provide electrical power from the second electrical machine to the first electrical machine, to drive the first electrical machine.

The controller may be arranged to selectively change fuel flow to the second engine concurrently with reducing the fuel flow to the first engine.

The amount of electrical power provided to the first electrical machine and the change in fuel flow to the second engine may be arranged to maintain the total thrust of the aircraft as unchanged.

The controller may be arranged to change the fuel flow to the second engine such that the thrust of the second engine remains unchanged, and wherein the electrical power provided to the first electrical machine causes the thrust of the first engine to remain unchanged.

The change in fuel flow to the second engine may be of the opposite sign to the change in fuel flow to the first engine. The change in fuel flow to the second engine may also be of a different magnitude to the change in fuel flow to the first engine.

The thrust of the first and second engines may be changed when the electrical power transfer occurs.

The first and second engines may be provided at different distances from a centreline of the aircraft, such that an exhaust plume of one of the engines is entrained in a wingtip vortex, to a greater degree than an exhaust plume of the other engine.

The aircraft propulsion system may comprise: three or more engines each having a corresponding electrical machine coupled to the engine. The engines may be arranged in groups, each group having one or more engine. The controller may be arranged to, based on expected properties of contrails formed in exhaust plumes of engines in a first group of engines and/or engines in a second group of engines, selectively reduce fuel flow to the engines in the first group of engines, and provide electrical power from the electrical machines coupled to the engines in the second group of engines to the electrical machines coupled to the engines in the first group of engines, to drive the electrical machines coupled to the engines in the first group of engines to at least partially drive the engines in the first group of engines. Each engine may comprise one or more spools. The electrical machines may be coupled to the same spool of each engine.

The electrical machines may be coupled to a first spool of each engine. The first spool may be arranged to rotate at a slower speed than at least one other spool. The first spool may be arranged to rotate at a slower speed than any other spool.

Each engine may comprise: an electrical machine coupled to a first spool of the engine; and an electrical machine coupled to a second spool of the engine.

The second electrical machine may be arranged to be driven by electrical power in order to at least partially drive the second engine. The first electrical machine may be arranged to be driven by the first engine to generate electrical power. The controller may be arranged to, based on expected properties of contrails formed in an exhaust plume of the first engine and/or second engine, either selectively reduce fuel flow to the first engine, and provide electrical power from the second electrical machine to the first electrical machine to drive the first electrical machine to at least partially drive the first engine; or selectively reduce fuel flow to the second engine, and provide electrical power from the first electrical machine to the second electrical machine to drive the second electrical machine to at least partially drive the second engine.

The controller may be arranged to: determine a cost function associated with each possible change of fuel flow and thrust of the first engine; select a combination of changes to fuel flow and thrust for the first engine; and control the propulsion system based on the selected combination of changes to fuel flow and thrust for the first engine.

The controller may be arranged to: for each possible change of fuel flow and thrust of the first engine, determine a corresponding change in fuel flow and thrust to the second engine, the corresponding change in fuel flow and thrust to the second engine incorporated in the cost function; and control the propulsion system based on the selected combination of changes to fuel flow and thrust for the first engine and the corresponding change in fuel flow and thrust to the second engine.

The cost function may include one or more of: a cost associated with changes in contrail properties; a cost associated with extra fuel use; and a cost associated with changes to carbon dioxide emissions.

The change in thrust for the first engine may be set to zero, based on one or more of the aircraft configuration, ambient conditions and operating conditions.

The controller may be arranged to promote or reduce contrail formation in dependence on ambient and operational conditions.

According to an example, there is provided a method of controlling an aircraft propulsion system having at least two engines, the method comprising, based on expected properties of contrails formed in an exhaust plume of a first engine and/or a second engine: reducing fuel flow to the first engine; providing electrical power to a first electrical machine to at least partially drive the first engine; generating the electrical power using a second electrical machine driven by the second engine.

The method may comprise: changing fuel flow to the second engine concurrently with reducing the fuel flow to the first engine, to accommodate the generation of electrical power.

The amount of electrical power provided to the first electrical machine and the change in fuel flow to the second engine may be arranged to maintain the total thrust of the aircraft as unchanged.

According to an example, there is provided a machine readable medium containing instructions which, when read by a machine, cause the machine to control an aircraft propulsion system to perform the method of the second aspect.

According to an example, there is provided: an aircraft propulsion system comprising: at least two engines, each engine having: a propulsive fan and an engine core, the engine core comprising a compressor, a combustor and a turbine driven by a flow of combustion products from the combustor, the propulsive fan at least partially driven by the turbine and configured to generate a mass flow of air that bypasses the engine core to generate thrust; a first electrical machine coupled to a first engine, the first electrical machine arranged to be driven by electrical power in order to at least partially drive the propulsive fan of the first engine; a second electrical machine coupled to a second engine, the second electrical machine arranged to be driven by the second engine to generate electrical power; an electrical network arranged to allow transmission of electrical power between the first electrical machine and the second electrical machine; and a controller arranged to, based on expected properties of contrails formed in an exhaust plume of the first engine and/or second engine, provide electrical power from the second electrical machine to the first electrical machine, to drive the first electrical machine to at least partially drive the first engine.

At least some of the following examples are described with reference to an aircraft propulsion system. As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan (or gas turbine engine) is designed to operate. This may mean, for example, the conditions at which the fan (or gas turbine engine) is designed to have optimum efficiency.

In use, a gas turbine aircraft engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Note that the terms "low-pressure turbine" and "low-pressure compressor" as used herein may be taken to mean the lowest pressure turbine stages and lowest pressure compressor stages (i.e. not including the fan) respectively and/or the turbine and compressor stages that are connected together by the interconnecting shaft with the lowest rotational speed in the engine (i.e. not including a gearbox output shaft that drives the fan). The "low-pressure turbine" and "low-pressure compressor" referred to herein may alternatively be known as the "intermediate-pressure turbine" and "intermediate-pressure compressor". Where such alternative nomenclature is used, the fan may be referred to as a first, or lowest pressure, compression stage. The intermediate pressure compressor may also be known as a booster compressor.

The terms "high-pressure turbine" and "high-pressure compressor" as used herein may be taken to mean the highest pressure turbine stages and highest pressure compressor stages respectively and/or the turbine and compressor stages that are connected together by the interconnecting shaft with the highest rotational speed in the engine.

Unless used as described above, the terms "intermediate-pressure turbine" and "intermediate-pressure compressor" as used herein may be taken to respectively mean the turbine stages and compressor stages with rotational speed between the high-pressure turbine/compressor and the low-pressure turbine/compressor and/or the turbine and compressor stages that are connected together by the interconnecting shaft with rotational speed between the highest and lowest rotational speeds in the engine.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE SEVERAL VIEWS OF THE DRAWINGS

Examples are described below with reference to the accompanying drawings in which.

DETAILED DESCRIPTION

Figure 1:
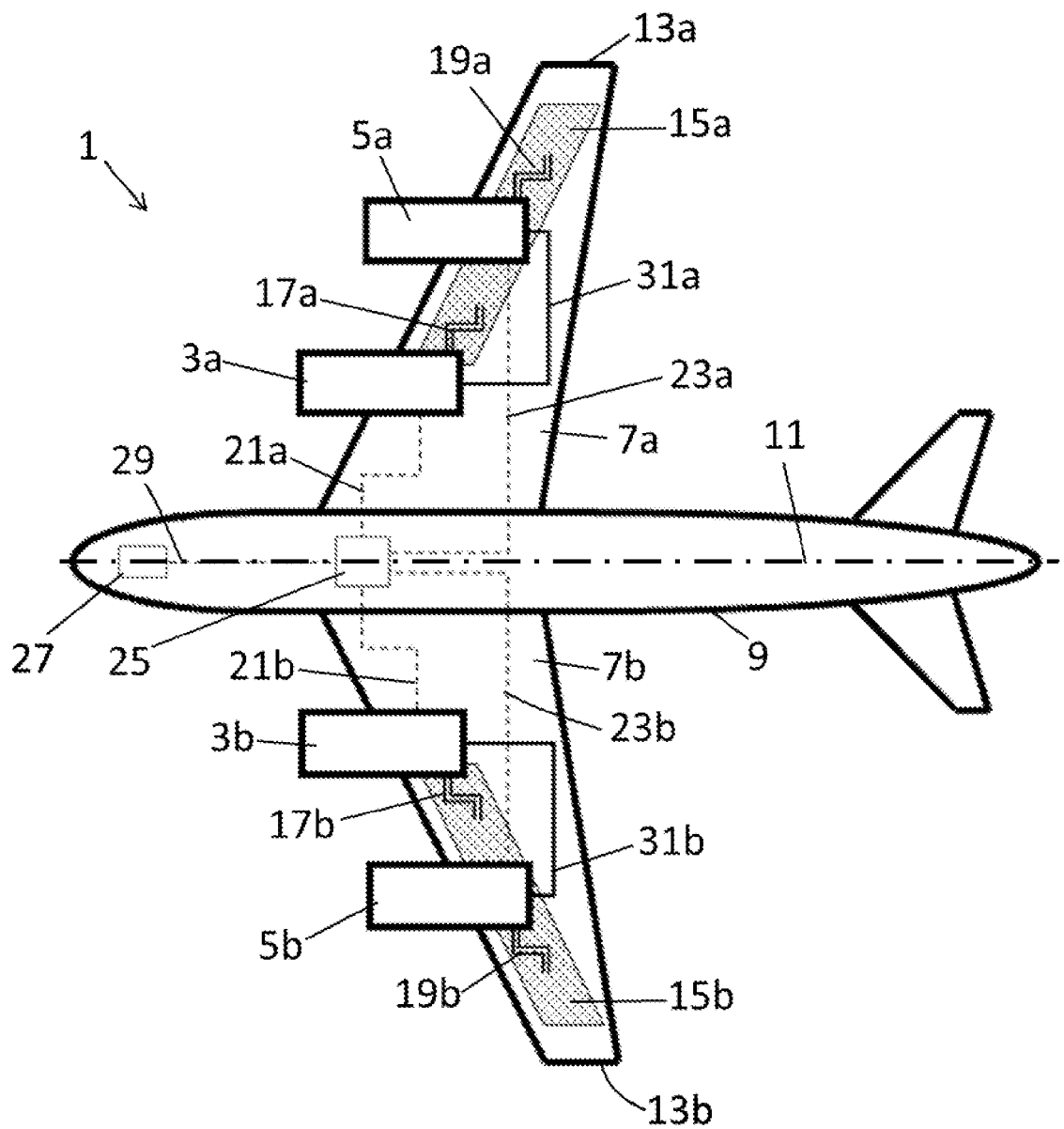
FIG. 1 is a schematic illustration of a propulsion system of an aircraft.

FIG. 1 illustrates a four-engine aircraft 1 according to a first example. The aircraft 1 has a propulsion system in which four gas turbine turbofan engines 3a, 3b, 5a, 5b are mounted beneath the wings 7a, 7b of the aircraft 1. The engines 3a, 3b, 5a, 5b are arranged symmetrically around the centreline 11 of the aircraft 1. A first pair/subset 3a, 3b of the engines (the inboard engines) can be defined for which the engines are relatively closer to the aircraft fuselage 9. The engines in a second pair/subset 5a, 5b (the outboard engines) are spaced further from the aircraft fuselage 9, i.e. further along the wings 7a, 7b in a span direction. The locations of the engines may be defined with reference to a centreline or central axis 11 of the airframe or else a spacing from a tip 13a, 13b of either wing 7a, 7b.

Fuel tanks 15a, 15b are mounted in the wings 7a, 7b. Each engine 3a, 3b, 5a, 5b is configured to draw fuel or receive fuel from one or more fuel tank 15a, 15b via one or more fuel supply 17a, 17b, 19a, 19b. Other details of the fuel system, such as cross-feed fuel-lines, are not shown. Although the fuel-tanks are shown mounted exclusively in the wings it will be appreciated that other fuel-tank locations are also contemplated.

Each inboard turbofan engine 3a, 3b is connected via a respective signal communication connection 21a, 21b with a control and decision-making unit 25. Likewise, each outboard turbofan engine 5a, 5b is connected via a respective signal communication connection 23a, 23b with the control and decision-making unit 25.

In some embodiments the signal communication connections 21a, 21b, 23a, 23b between the control and decision-making unit 25 and a single engine could be implemented by a single cable or bundle of cables per engine.

In one embodiment, the single control and decision-making unit 25 may be common to all engines 3a, 3b, 5a, 5b on the aircraft 1. In a second embodiment, some or all functions of the control and decision-making unit 25 may be incorporated into engine-specific controllers 132 (shown in FIG. 2).

The control and decision-making unit 25 is configured to receive signals from the cockpit 27, via signal communication connection 29, specifying for each engine 3a, 3b, 5a, 5b individually or all engines 3a, 3b, 5a, 5b concurrently a desired thrust level, or a proxy for a desired thrust level such as an angle of the one or more thrust lever in the cockpit, or a desired rotational speed of a propulsive fan of the or each engine.

Electrical transmission connections 31a, 31b allow electrical power transfer from the inboard engines 3a, 3b to the outboard engines 5a, 5b and/or from the outboard engines 5a, 5b to the inboard engines 3a, 3b. The electrical transmission connections 31a, 31b could be implemented by a single cable or bundle of cables per pair of connected engines.

In the example shown in FIG. 1, the electrical power transfer is conducted between the engines 3a, 3b, 5a, 5b on the same wing 7a, 7b. Therefore, electrical power is transferred between the inboard engine 3a and outboard engine 5a (or vice versa) on a first wing 7a, and between the inboard engine 3b and the outboard engine 5b (or vice versa) on the other wing 7b, but there is no power transfer between engines 3a, 3b, 5a, 5b on different wings 7a, 7b. However, it is to be understood that the arrangement of FIG. 1 is by way of example only and other arrangements could be contemplated such as power sharing between wings 7a, 7b.

Figure 2:
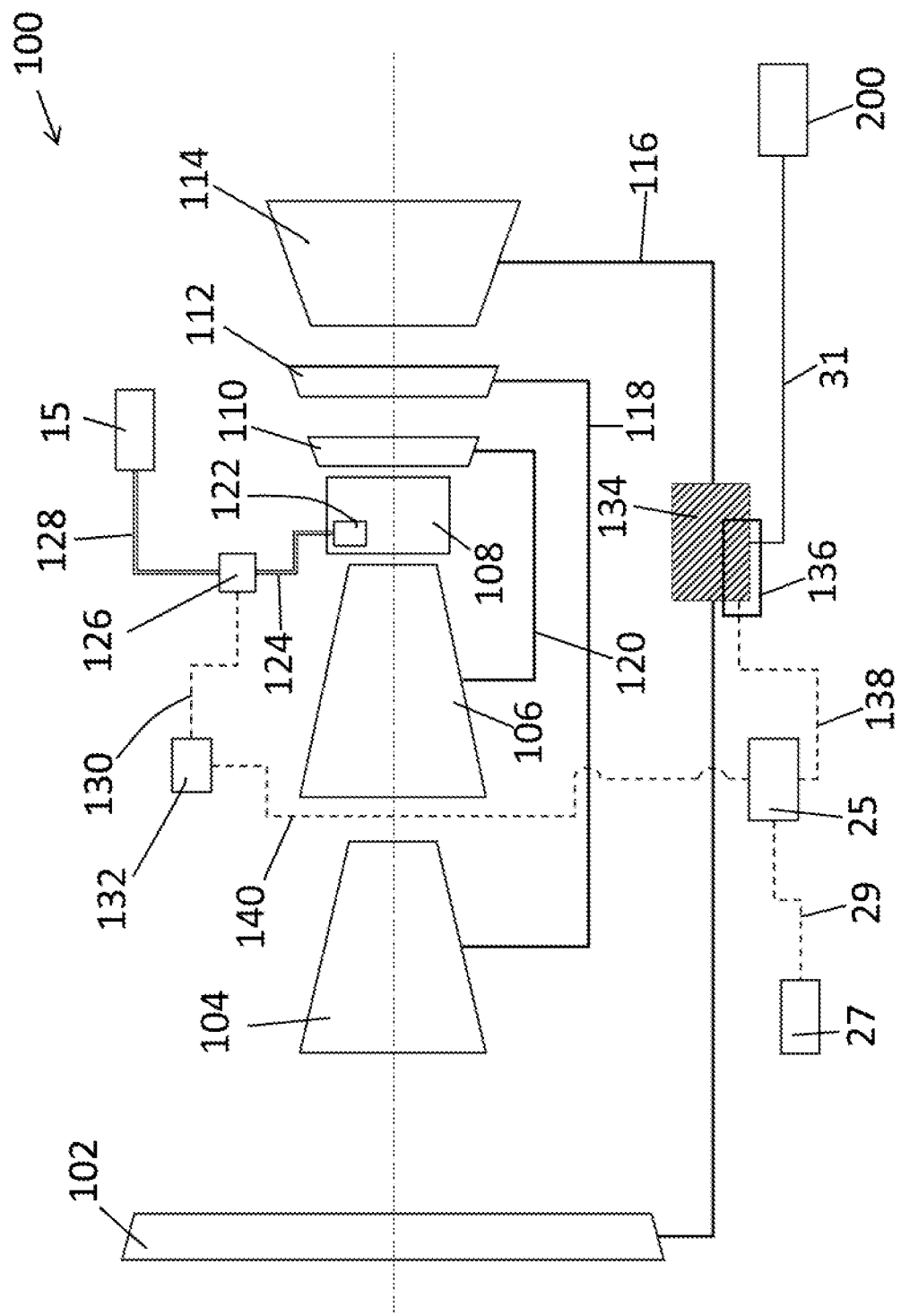
FIG. 2 is a schematic illustration of one of the engines of the propulsion system of FIG. 1.

FIG. 2 shows more details of one of the gas turbine turbofan engines 100 from the aircraft 1 of FIG. 1. It will be appreciated that all four gas turbine engines in FIG. 1 may be of the configuration as shown in FIG. 2.

The gas turbine engine 100 in FIG. 2 is a three-spool turbofan engine 100. The engine 100 comprises, in axial flow series, a propulsive fan 102, an intermediate-pressure compressor 104, a high-pressure compressor 106, a combustor 108, a high-pressure turbine 110, an intermediate-pressure turbine 112, and a low-pressure turbine 114.

The low-pressure turbine 114 is drivingly connected via shaft 116 to the propulsive fan 102. The intermediate-pressure turbine 112 is drivingly connected via shaft 118 to the intermediate-pressure compressor 104. The high-pressure turbine 110 is drivingly connected via shaft 120 to the high-pressure compressor 106.

The combustor 108 comprises one or more fuel injectors or fuel spray nozzles 122 which receives fuel via fuel supply pipe 124 at a rate governed by fuel pump or fuel flow regulator 126 which draws fuel from, or passes fuel received from, one or more fuel tank 15 via one or more fuel supply pipe 128 in dependence upon a fuel flow rate signal received via signal communication link 130 from an engine controller 132.

Collectively, the fan 102, low-pressure turbine 114, the shaft 116 connecting the two and any other components such as the nose cone which are obliged to rotate at the same rotational speed as the low-pressure turbine 114 are referred to as the low-pressure spool. The speed of rotation of the low-pressure spool is typically denoted N1.

Collectively, the intermediate-pressure compressor 104, intermediate-pressure turbine 112, the shaft 118 connecting the two, and any other components which are obliged to rotate at the same rotational speed as the intermediate-pressure turbine 112 are referred to as the intermediate-pressure spool. The speed of rotation of the intermediate-pressure spool is typically denoted N2.

Collectively, the high-pressure compressor 106, high-pressure turbine 110, the shaft 120 connecting the two, and any other components which are obliged to rotate at the same rotational speed as the high-pressure turbine 110 are referred to as the high-pressure spool. The speed of rotation of the high-pressure spool is typically denoted N3.

The total temperature (or stagnation temperature) of air exiting the combustor 108 is typically denoted T40.

In the example shown in FIG. 2, an electrical machine 134 is attached to the low-pressure spool of the engine 100. The electrical machine 134 is configured to operate as a motor in a first mode of operation and as a generator in a second mode of operation. Therefore, in the first mode, the electrical machine provides assistance to the low pressure spool, increasing the speed over what could be achieved through the action of the turbine only, thus increasing the thrust output of the engine 100. In the second mode, the spool drives the electrical machine to generate electrical power, thus reducing the amount of work from the turbine that is used to provide thrust, thus reducing the thrust output of the engine 100.

In the example shown, the electrical machine 134 is drivingly connected to the low-pressure shaft 116, but it is to be understood that other arrangements are contemplated in which the electrical machine 134 may be drivingly connected to other parts of the low-pressure spool.

The electrical machine 134 may comprise a controller 136, which in turn may comprise or operate in conjunction with power electronics, such as one or more rectifier, inverter, DC-DC converter or AC-AC converter, necessary to operate the electrical machine 134 and/or to interface with other components.

As discussed above, an electrical transmission connection 31 is provided to allow power transfer from the engine 100 to one or more further engine 200, and/or from the one or more further engine 200 to the turbofan 100. This allows electrical power sharing between the low-pressure spool of the engine 100 and the low-pressure spool of the further engine, and vice versa, without the need for any electrical energy storage, such as batteries. Energy transmission along electrical transmission connection 31 will take place in only one direction at a time. The rate of energy transmission in either direction is variable.

The engines 3a, 3b, 5a, 5b of the aircraft 1 shown in FIG. 1 are divided into groups. Where the engines have different positions based on the proximity to the wingtips 13a, 13b, the groups are based on their position relative to the wingtips 13a, 13b. For example, for the aircraft 1 shown in FIG. 1, the engines are split into two groups: the inboard engines 3 and the outboard engines 5. Where all engines are positioned the same distance relative to the wingtips 13a, 13b, the engines may be split into groups based on the centreline 11 of the aircraft 1.

The one or more further engine 200 in FIG. 2 is a member of the opposite engine group to the engine 100. Therefore, in the example of FIG. 1, if the engine 100 is one of the inboard engines 3a, 3b, then the further engine 200 will be one of the outboard engines 5a, 5b and if the engine 100 is one of the outboard engines 5a, 5b, then the further engine 200 will be one of the inboard engines 3a, 3b.

As discussed above, the control and decision-making unit 25 receives a signal or signals representing the required thrust level (or a proxy therefor) for a plurality of engines 3, 5 from the cockpit 27 via signal communication connection 29. Signal communication connection 140 is provided to allow the control and decision-making unit 25 to send signals to, and optionally to receive signals from, the engine controller 132 to implement the desired thrust level.

The electrical machine 134 and its controller 136 are also in signal communication with the control and decision-making unit 25, via signal communication connection 138. The signal communication connections 138, 140 may be provided by either the inboard signal communication connection 21a, 21b or outboard signal communication connection 23a, 23b discussed above.

For each engine 3a, 3b, 5a, 5b or group of engines 3, 5, the control and decision-making unit 25 determines the level of electrical power offtake or electrical assistance that should be taken from or applied to the low-pressure spool by the electrical machine 134 in dependence upon a variety of parameters as explained below. The control and decision-making unit 25 instructs the controller 136 via signal communication connection 138 to implement the determined level of electrical power offtake or electrical assistance.

It may be that the control and decision-making unit 25 determines, using well understood engine control methods that take into account the electrical assistance or power offtake, the fuel flow rate to be supplied to the fuel injector(s) or fuel spray nozzle(s) 122 to achieve the required thrust. The control and decision-making unit 25 instructs the engine controller 132 to implement the fuel flow rate via signal communication connection 140. Alternatively, the control and decision making unit 25 determines a change in thrust (or proxy therefor) required of the engine 100 and communicates a modified thrust demand signal to the engine controller 132 via signal communication connection 140. The engine controller 132 determines the required fuel flow rate using the engine control methods. In some cases, no thrust change may be required, and so the thrust signal is unmodified.

Contrail formation can occur as engine exhaust gases mix with ambient air. The number density of condensation nuclei in the engine exhaust plume will influence the size distribution of ice crystals in the young contrail. Specifically, the greater the number density of condensation nuclei (contrail inducting parameter) then the smaller will be the initial size of formed ice crystals (and the greater will be the optical depth of the contrail at that point). The persistence of a contrail once formed is influenced by ambient conditions, and, in particular the level of ice saturation of ambient air. One example of the contrail inducting parameter is an initial number of non-volatile particulate matter (nvPM) emitted per unit of distance of travel of the aircraft.

During operation, the exhaust plumes of engines 5a, 5b located sufficiently close to the wingtips 13a, 13b become at least partially entrained in the wingtip vortices of the aircraft. Contrail-forming particles entrained in the vortices are subject to adiabatic heating due to descent of the vortex. As a result, ice mass may be lost from the surface of the ice particles via sublimation, leading to elimination of some of the particles having the smallest diameter/size, thereby leading to a reduction in the optical depth of the contrail downstream of the vortex region.

Ice particles entrained and retained within the wingtip vortices for the entire lifetime of the wingtip vortices constitute a primary wake of the aircraft and are subject to greater heating. Ice particles which remain un-captured by wingtip vortices, and ice particles which become detrained from the wingtip vortices prior to vortex breakup, together constitute a secondary wake. The contribution of the outboard engines 5a, 5b to the secondary wake may be minimal depending on the precise location of the engines relative to the wingtip 13a, 13b, whereas the contribution of the inboard engines 3a, 3b to the primary wake may be minimal, or at least significantly less than that of the outboard engines 5a, 5b, particularly when the inboard engines 3a, 3b are close to the centreline 11 of the aircraft 1.

Variation in pre-vortex ice particle size distribution can influence the particle size distribution, and hence the optical depth, of the post-vortex contrail. This is at least in part because pressure is typically lower than ambient pressure within the core of a vortex, and, as a result, the temperature is also lower. Therefore, the relative humidity within the vortex core is higher than in the ambient air, at least initially. If this relative humidity is such that the air within the vortex core is supersaturated with respect to ice, then any ice particles trapped within the core can grow as a result of a deposition process. However ice particle growth will reduce the level of super-saturation within the vortex core. Furthermore the vortex core will descend over time and hence experience adiabatic heating which further reduces the relative humidity within the vortex core and, if the reduction in relative humidity is sufficient to eliminate any super-saturation, there is a resulting loss of ice mass from the surface of the ice particles which therefore shrink due to a sublimation process.

Therefore, contrail particles of smaller initial size/diameter are more likely to be completely eliminated within the wingtip vortex than larger contrail particles. This process is dependent upon the level of ambient air super-saturation, which determines the initial level of super-saturation within the wingtip vortex core and the extent of initial ice-particle growth before the adiabatic heating effects dominate. The vertical distance travelled by the vortex during its lifetime influences the degree of heating.

During vortex descent, any sub-saturation resulting from the adiabatic heating will result in sublimation of ice from the contrail particles in order to restore saturation. Saturation is restored once a given mass of ice has turned to vapour. The smaller the initial size of an ice particle, the less ice mass it must lose before it disappears altogether, and the lower the increase in humidity within the vortex core arising from its elimination.

Therefore, if the initially forming contrail, prior to entrainment in a vortex, features a greater number density of ice particles, it will contain a greater proportion of smaller ice particles and as a result a greater proportion of ice particles will be lost during adiabatic heating within the vortex. Hence the increase in optical depth, attributable to the greater initial number of ice particles, of the post-vortex contrail will be less than the increase in optical depth of the pre-vortex contrail.

Figure 3A:
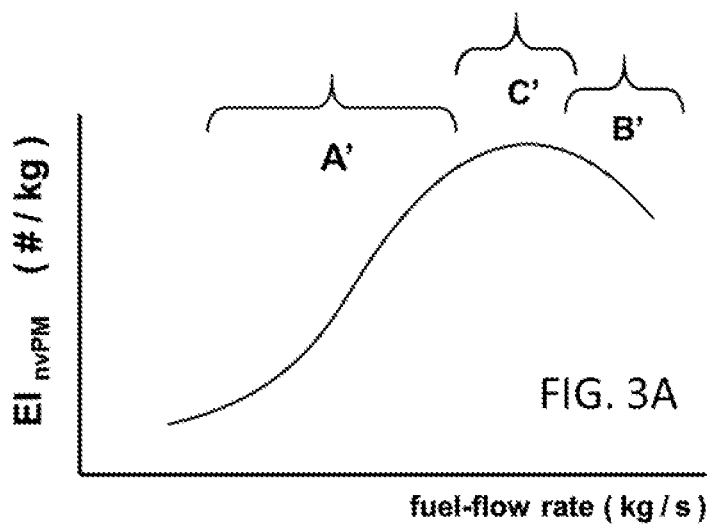
FIGS. 3A and 3B illustrate the non-volatile particulate matter number (nvPM #) emission characteristics of a rich burn type engine.

FIG. 3A shows an example chart schematically showing the dependency of the non-volatile particulate matter (nvPM) number emission index (i.e. the number of nvPM particles produced per kg of fuel burned) of an engine as a function of the fuel flow rate. In a first regime of operation A' at lower fuel flow rate, the gradient is positive and of a magnitude which lies above a first predetermined threshold. Therefore, in the first regime, the nvPM number emission index increases with increasing fuel flow rate In a second regime of operation B' at higher fuel flow rate, the gradient is negative and of a magnitude which lies above a second predetermined threshold. Therefore, in the second regime, the nvPM number emission index decreases with increasing fuel flow rate.

In a third regime of operation C', between the first and second regimes, the gradient is low in magnitude, being either positive and of a magnitude lying at or below the first predetermined threshold, or negative and of a magnitude lying at or below the second predetermined threshold.

Irrespective of the above regimes of operation, a small increase or decrease in fuel flow rate will cause a corresponding increase or decrease in the amount of water vapour emitted by the engine per unit distance of travel. Since the emission index of water vapour is independent of the fuel flow rate, then the percentage change in water vapour emitted per unit distance of travel is directly proportional to the percentage change in fuel flow rate to the engine, while remaining at constant air speed.

However, in the first regime of operation A', the nvPM # emission index increases with increasing fuel flow rate and so the percentage increase of the number density of emitted nvPM condensation nuclei caused by an increase in fuel flow rate is greater than the percentage increase of the emitted water vapour per metre of travel for the same increase in fuel flow rate.

In the second regime of operation B', the nvPM # emission index decreases with increasing fuel flow rate. As a result, the percentage increase of the number density of emitted nvPM condensation nuclei caused by an increase in fuel flow rate is less than the percentage increase of the emitted water vapour per metre of travel for the same increase in fuel flow rate. In some parts of the second regime of operation B', the increase of the number density of emitted nvPM condensation nuclei caused by an increase in fuel flow rate may be negative i.e. representing a decrease in number density.

In the third regime of operation C', the gradient of the nvPM # emission index curve is much closer to zero i.e. the curve is almost horizontal. As a result, the percentage increase of the number density of emitted nvPM condensation nuclei caused by an increase in fuel flow rate is broadly similar to the percentage increase of the emitted water vapour per metre of travel for the same increase in fuel flow rate. A number of competing factors make the outcome predictable only with a more detailed analysis. Examples of the calculation process for a suitable control scheme are set out below to allow a controller to identify whether there is an achievable benefit by use of the invention.

Figure 3B:
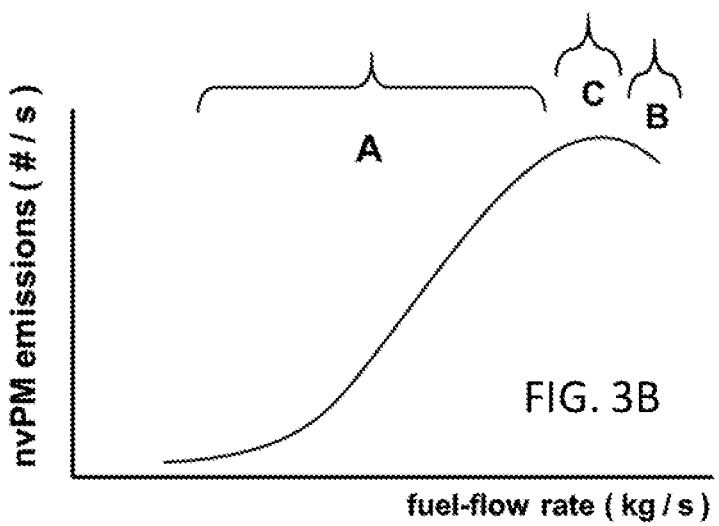

The number of nvPM particles produced by the engine 3a, 3b, 5a, 5b per unit time is given by the product of the fuel mass flow rate of the engine and the corresponding nvPM # emission index, and is shown in FIG. 3B. This includes a region A in which the gradient is materially positive, a region B in which the gradient is materially negative and a region C in which the gradient is substantially zero.

Figure 3C:
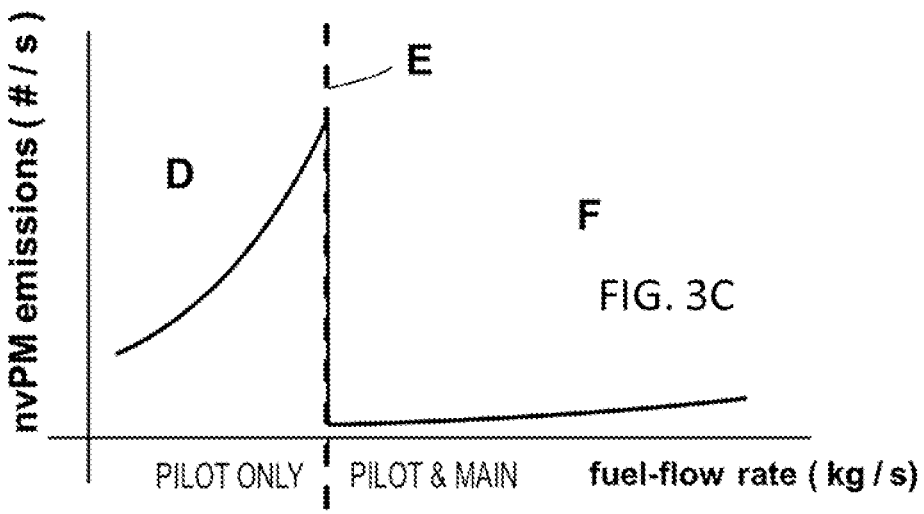
FIG. 3C illustrates the non-volatile particulate matter number (nvPM #) emission characteristics of a lean burn type engine.

FIGS. 3A and 3B show respectively the nvPM # emission index and the nvPM # emission rate for a rich burn type engine, in which there is a single type of fuel injector 122. FIG. 3C shows a corresponding relationship between fuel flow rate and nvPM particle emission-rate for a typical lean-burn combustor. This shows a first region D, to the left of staging point E, in which only pilot burners are operating in the combustor 108, and in which nvPM # rises rapidly with increasing fuel flow rate. The figure also shows a second region F, to the right of staging point E, in which both the pilot burners and the main burners are operating, and in which nvPM # is much lower and rises only slowly (if at all) with increasing fuel flow rate. Typically the position of staging point E is chosen such that the fuel flow rate during most or all cruise conditions falls to the right of staging point E, in a region in which the main burners are operating and in which nvPM # is very low.

In view of the above discussion of FIGS. 3A to 3C, it will be appreciated that for some operating conditions of the engines 3a, 3b, 5a, 5b, the reverse of the fuel flow rate modification described in FIGS. 1 and 2 will be implemented, for example whereby the fuel flow rate of the outboard engines 5a, 5b will be decreased and the fuel flow rate of the inboard engines 3a, 3b will be increased accordingly.

Figure 3D:
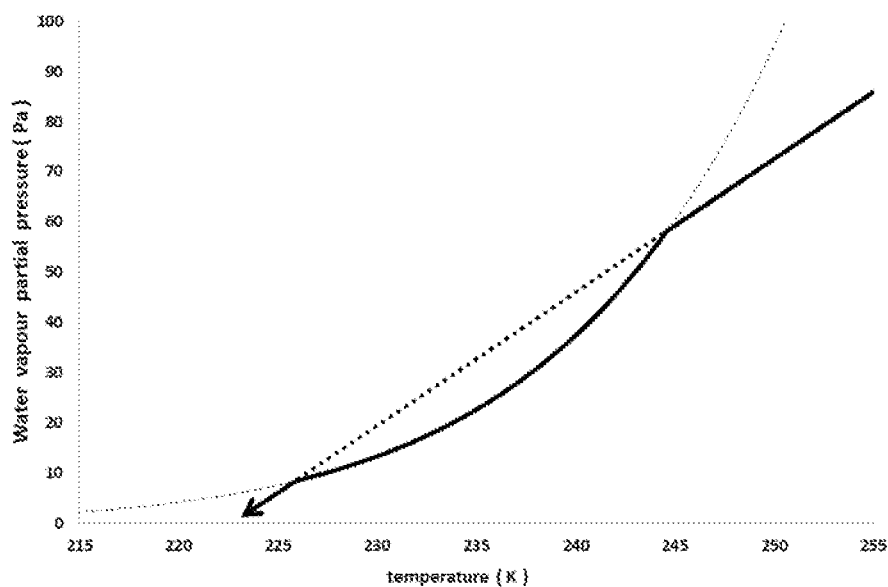
FIGS. 3D and 3E show example exhaust mixing trajectories for the engine of FIG. 2.

FIG. 3D shows the variation in water-vapour partial pressure of a parcel of engine exhaust air with local static temperature, as it mixes with ambient air.

Two potential mixing trajectories are shown (thick solid line and thick dotted line), as is the water-vapour saturation curve which corresponds to a relative humidity over water (RHW) of 100% (thin dashed line).

Both the potential mixing trajectories start at the top right and move downwards and to the left until they reach ambient conditions shown by the arrowhead, corresponding to full dilution of the exhaust with ambient air.

The initial segment of both potential mixing trajectories is the same. However, once they meet the water saturation curve their behaviours diverge. In one potential case (thick dotted line) corresponding to a complete absence of condensation, the trajectory continues down a substantially straight line. In the other potential case (thick solid line), rapid depletion by condensation of any water vapour in excess of the saturation vapour pressure corresponding to the local static temperature causes the trajectory to follow the water vapour saturation curve. In the final section, both trajectories once again follow the same path. Despite some differences in the actual path followed by each of these mixing trajectories, it will be appreciated that the overall gradient of both the mixing trajectories shown here is the same. The overall gradient of a mixing trajectory is sometimes known as the contrail factor.

The number of possible nvPM condensation nuclei emitted per unit time is given by the product of nvPM # emission index and fuel flow rate. The proportion of those potential nuclei that become activated and thus give rise to ice particles is determined at least in part by the extent to which local RHW exceeds 100% during mixing.

In conjunction with ambient conditions (temperature, RHW) the contrail factor determines whether or not the mixing line reaches/crosses the water saturation curve at any point in the mixing process. If local RHW reaches/exceeds 100%, even briefly, then condensation can take place, forming water droplets. If local RHW only slightly/briefly exceeds 100%, then only a small proportion of the emitted soot particles may become activated as condensation nuclei and give rise to droplets. Conversely if local RHW greatly exceeds 100%, most or even all of the emitted soot particles may give rise to water droplets. The water droplets will then quickly freeze to yield ice particles. It will be appreciated that the two potential trajectories shown in FIG. 3D represent extremes and that in practice the trajectory followed by an air parcel during mixing and condensation may often lie somewhere between these two extremes.

It will also be appreciated that different assumptions concerning ambient conditions, engine parameters and fuel parameters will give rise to substantially different mixing trajectories, including in some cases mixing trajectories that do not cross the water vapour saturation curve at all and which therefore correspond to an absence of contrail formation. In such cases the thick dotted line and the thick solid line would be the same as each other since a lack of condensation means there would be no difference between them.

Figure 3E:
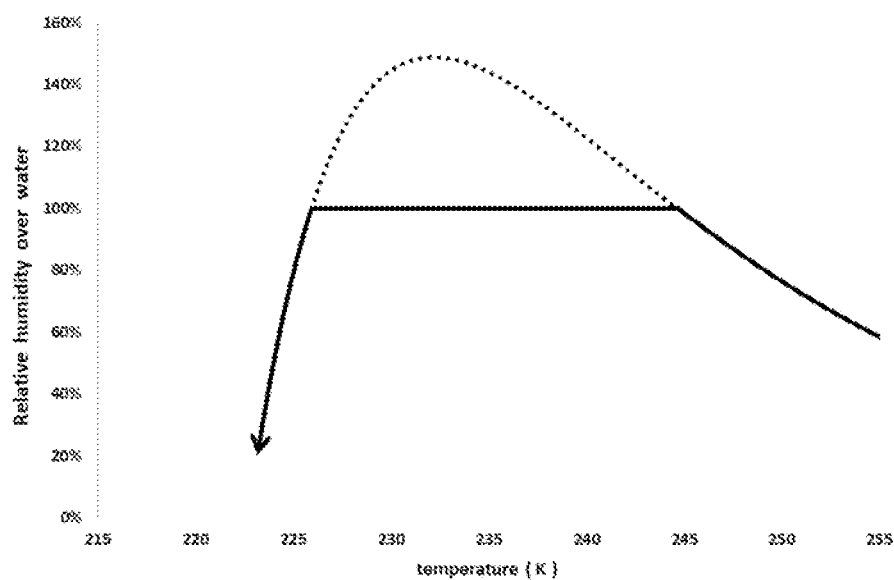

FIG. 3E shows the corresponding local relative humidity over water (RHW) as a function of local static temperature. The thick solid line rises to 100% RHW and is then capped, due to rapid condensation, at 100% RHW prior to falling to ambient RHW. The thick dotted line continues past 100% RHW and reaches a maximum before reducing once again. As discussed above, these two potential trajectories represent extremes and in most cases the mixing trajectory may lie somewhere between the trajectories. Therefore, in the example shown, the relative humidity experienced by an air parcel during mixing can reach a peak value of at least 100% and perhaps as high as the peak shown for the thick dotted line.

The lower end of the mixing trajectory corresponds to, and is therefore determined by, ambient conditions. It will also be appreciated that by increasing or decreasing the overall gradient of the mixing trajectory, respectively higher or lower peak values of RHW may be reached during mixing, for the same ambient conditions.

In one example, increasing the gradient of the overall mixing trajectory may raise the peak value of RHW such that a non-contrail forming condition may become a contrail forming condition. Conversely, reducing the gradient of the overall mixing trajectory may lower the peak value of RHW such that a contrail-forming condition may become a non-contrail-forming condition.

By altering the fuel flow rate for the engines 3a, 3b, 5a, 5b the mixing trajectory and/or nvPM # emission index for each engine 3a, 3b, 5a, 5b can be selectively altered to control contrail formation. Concurrently, electrical power is transferred between the engines 3a, 3b, 5a, 5b to accommodate the changes in fuel flow rates, whilst maintaining constant total thrust for the aircraft 1.

Figure 4:
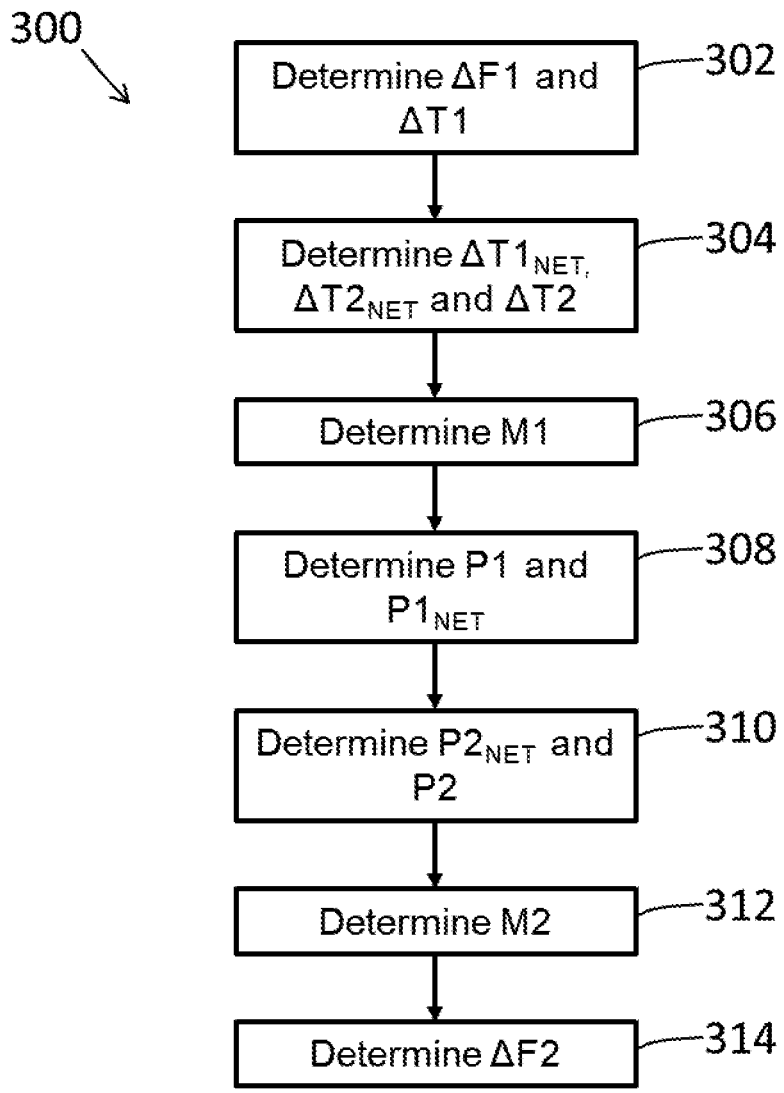
FIG. 4 illustrates a method of operating the propulsion system of FIG. 1.

FIG. 4 illustrates a method 300 of determining operational parameters (such as fuel flow and thrust) for the individual engines 3a, 3b, 5a, 5b or engine groups 3, 5 in the propulsion system of the aircraft 1 shown in FIG. 1. In operation, the control and decision making unit 25 is configured to synchronise electrical power offtake from one or more engine 3a, 3b, 5a, 5b concurrently with electrical power assistance to one or more further engine 3a, 3b, 5a, 5b to manage the formation and characteristics of contrails. Contrail formation and characteristics are controlled by changing the exhaust characteristics of the different engine groups 3, 5.

During conventional aircraft operation without the method of FIG. 4, the engines 3a, 3b, 5a, 5b each operate at substantially the same operating point, referred to herein as the nominal operating point, so as to provide a substantially equal thrust from each engine 3a, 3b, 5a, 5b. For example, the fuel flow rate of each engine 3a, 3b, 5a, 5b may be substantially the same. In the method shown in FIG. 4, different fuel flow rates are applied to each of the different engine groups 3, 5, relative to the nominal values. In the method 300, it will be assumed that there is no change in the airspeed or total thrust of the aircraft 1.

In a first step 302, two parameters are determined for a first group 3, 5 of engines: $\Delta F1$ and $\Delta T1$. $\Delta F1$ is the change in fuel flow rate required to each engine within the first group, based on the desired change in contrail characteristics. $\Delta T1$ is the change in thrust demand to each engine in the first group, based on the desired change in contrail characteristics. $\Delta F1$ and $\Delta T1$ are determined relative to the nominal fuel flow $F_N$ and the nominal thrust $T_N$ for each engine required to maintain the desired total thrust output T to the aircraft 1, with equal thrust generated by each engine 3a, 3b, 5a, 5b and no electrical power being generated from any engine to provide assistance to any of the other engines. $\Delta F1$ may lie within a range defined by a positive upper boundary and a negative lower boundary. The magnitude of the boundaries for $\Delta F1$ may be a predetermined fixed value, or a predetermined percentage of the nominal fuel flow rate. Alternatively, the magnitude of a boundary for $\Delta F1$ may take a different predetermined value, or a different predetermined percentage of the nominal fuel flow rate, for different nominal fuel flow rates.

$\Delta T1$ may lie within a range defined by a positive upper boundary and a negative lower boundary. The magnitude of the boundaries for $\Delta T1$ may be a predetermined fixed value, or a predetermined percentage of the nominal thrust. Alternatively, the magnitude of a boundary for $\Delta T1$ may take a different predetermined value, or a different predetermined percentage of the nominal thrust, for different nominal thrusts.

The upper boundaries of $\Delta F1$ and/or $\Delta T1$ may take a different magnitude from the corresponding lower boundary. The boundaries of $\Delta F1$ and $\Delta T1$ may be selected in order to avoid compromising engine operability. The selection may be made with reference to, amongst other things, the maximum amount of electrical assistance that is available for the engines within the first engine group, the desired thrust/airspeed of the aircraft, other engine and aircraft conditions and ambient conditions. Additionally or alternatively, the boundaries of $\Delta F1$ and/or $\Delta T1$ may be modified, or switched to a different predetermined value or a different set of predetermined values, in response to a sensed condition, for example detection of abnormal engine operation.

In a second step 304 $\Delta T1$ is multiplied by the number of engines in the first group to yield an overall change in thrust for the first engine group, $\Delta T1_{NET}$. Since the total thrust of the aircraft 1 is unmodified, the thrust change of the second engine group is determined by $\Delta T2_{NET} = -\Delta T1_{NET}$. The change in thrust of each engine in the second group is thus given by dividing $\Delta T2_{NET}$ by the number of engines in the second group.

In a third step 306, the mechanical assistance M1 required by each engine in the first group of engines to maintain the desired thrust level ($T_N + \Delta T1$) is determined, taking account of the fuel flow rate $F_N + \Delta F1$. This is done using methods familiar to the person skilled in the art.

Then at step 308, the amount of electrical assistance P1 for each engine in the first group of engines is determined, taking into account the efficiency of spool-mounted electrical machines 134 and any associated power electronics. P1 is multiplied by the total number of engines in the group to determine the total electrical assistance $P1_{NET}$ required for the first group.

Based on $P1_{NET}$ and taking account of losses incurred during transmission of electrical power between the two engine groups, the total electrical offtake required from second engine group $P2_{NET}$ in order to fulfil the electrical assistance requirements of the first engine group is determined at step 310. This is divided by the number of engines in the second group to obtain the required electrical offtake P2 from each engine in the second engine group.

Taking into account the efficiency of the spool-mounted electrical machine and any associated power electronics, the required mechanical power offtake M2 from each engine in the second group of engines is then determined at step 312.

Using methods familiar to the skilled person, the required change in fuel flow rate $\Delta F2$ which is necessary to generate the thrust desired for each engine in the second group of engines ($T_N + \Delta T2$), despite the mechanical power offtake M2, is calculated at step 314.

In a special case of the above method 300, $\Delta T1$ is set as 0 (and hence $\Delta T2$ is also 0). In this special case, the upper boundary of $\Delta F1$ is less than zero.

In the case of $\Delta T1 = 0$, $\Delta F2$ will always take the opposite sign to $\Delta F1$. Due to imperfect efficiency of inter-engine electrical power sharing, and also due to non-linearity of thrust as a function of fuel flow rate, the magnitude of $\Delta F2$ will in most cases differ from that of $\Delta F1$ even when both engine groups 3, 5 have the same number of engines 3a, 3b, 5a, 5b. Where $\Delta T1 \neq 0$, $\Delta F1$ and $\Delta F2$ may have the same or different sign.

Figure 5:
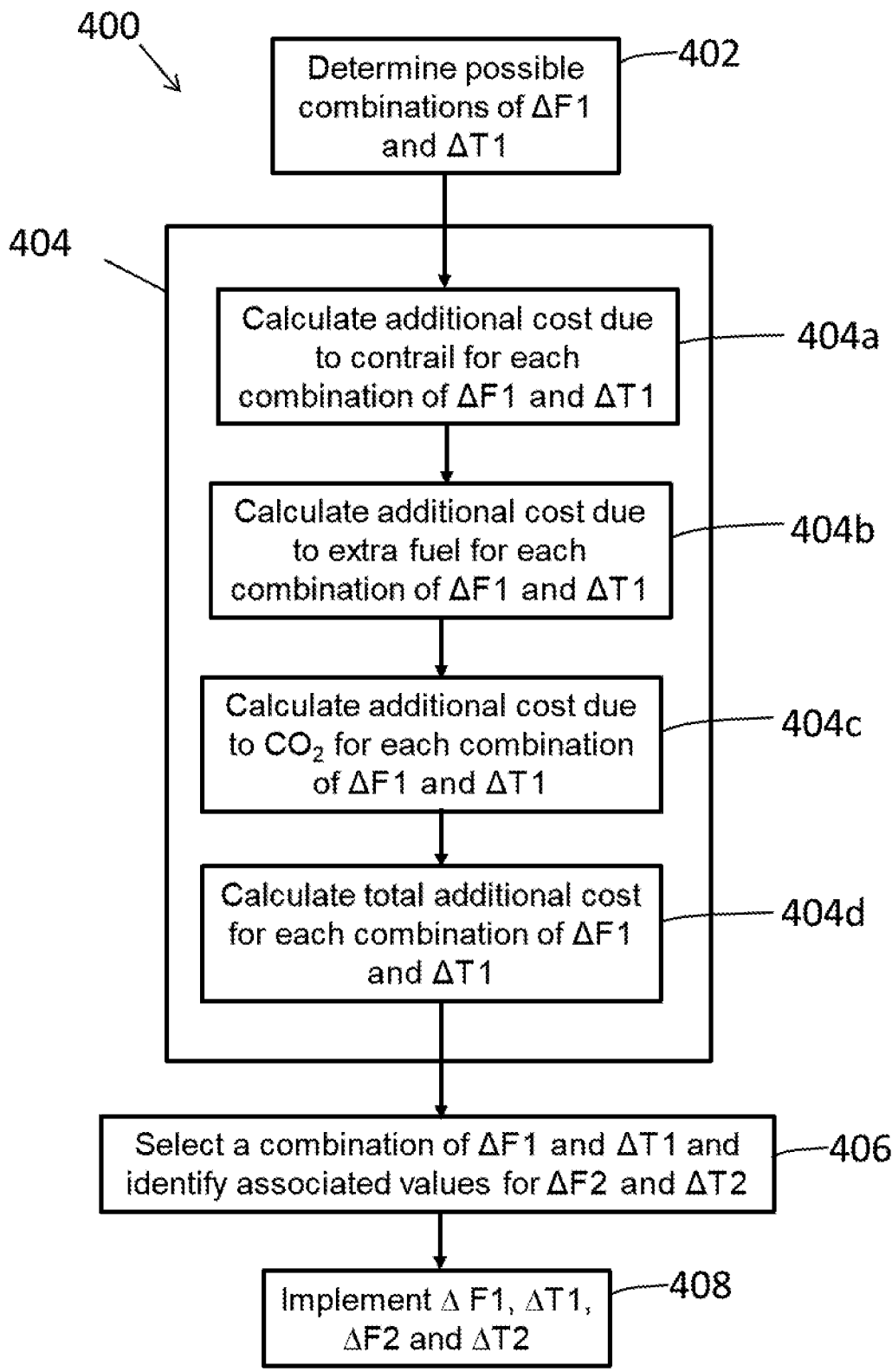
FIG. 5 illustrates a method of operating the propulsion system of FIG. 1.

FIG. 5 illustrates an example of a method 400 of controlling the propulsion system of an aircraft 1, such as shown in FIGS. 1 and 2. In the discussion of the method of FIG. 4, the first and second groups of engines are referred to. The thrust derived from combustion of fuel in the engines of the first group of engines is reduced and supplemented by electrical assistance from engines in the second group. It will be appreciated that in the method 400 of FIG. 5, either the inboard engines 3a, 3b or outboard engines 5a, 5b can be the first group of engines and the other of the inboard engines 3a, 3b or outboard engines 5a, 5b can be the second group.

It will be appreciated that under different circumstance, it may be desirable to either promote or reduce contrail formation. For example, under certain circumstances, promotion of contrails may have a desirable environmental effect, whilst under other circumstance, promotion of contrails may have a negative environmental effect.

At a first step of the method 402, the possible combinations of $\Delta F1$ and $\Delta T1$ are determined for both the inboard engines 3a, 3b being defined as the first group and the outboard engines 5a, 5b being defined as the first group. For each case, the $\Delta F1$ and $\Delta T1$ take a number of possible discrete values between the upper and lower boundaries discussed above.

In one example, the available range for $\Delta F1$ and $\Delta T1$ may be divided into a fixed number of discrete values. Therefore, where the upper and lower boundaries are relatively close, the step change between consecutive values may be relatively small compared to when the upper and lower boundaries are relatively far apart. Alternatively, there may be a fixed step between values, no matter what the boundaries. In this cases, wide ranges will cover a larger search space than narrower ranges. In yet further examples, the spacing between the different values may be different across the available range.

In a second step 404, fuel-use, carbon dioxide emissions and contrail properties are calculated for each possible combination of $\Delta F1$ and $\Delta T1$, to identify the resulting costs per unit distance of flight for each combination. The cost per unit distance of flight for $\Delta F1$ and $\Delta T1=0$ (the nominal operating condition) is also calculated. The difference between the cost per unit distance of flight for $\Delta F1$ and $\Delta T1=0$ and the cost per unit distance of flight for each combination of $\Delta F1$ and $\Delta T1$ is then determined. This yields a change in cost per engine or per engine group per unit distance of flight. A summation over engines or over engine groups is then performed to yield a total cost per unit distance of flight for the aircraft for each proposed combination of $\Delta F1$ and $\Delta T1$.

In step 406, a combination of $\Delta F1$ and $\Delta T1$ (and the associated $\Delta F2$ and $\Delta T2$) is selected for use. This may be the combination of $\Delta F1$ and $\Delta T1$ that gives the most negative change in total cost per unit distance of flight of the aircraft.

It will be appreciated that at times when contrail modification (enhancement or reduction) is unnecessary or is deemed undesirable (for example as a result of the cost function), then the aircraft 1 propulsion system is operated according to the nominal operating condition.

In step 408, the determined $\Delta F1$, $\Delta T1$, $\Delta F2$ and $\Delta T2$ and the required electrical assistance and electrical offtake are implemented by the control and decision-making unit 25.

In order to calculate the change in costs per unit distance of flight for each combination, $\Delta F2$ and $\Delta T2$ are calculated for each combination of $\Delta F1$ and $\Delta T1$ using the method shown in FIG. 4.

To calculate the post-vortex contrail properties of the engines 3a, 3b, 5a, 5b, in step 404a, the method set out in EP 3 875 742 is used. The post-vortex contrail properties are converted into an engine-specific or engine group-specific contrail climate impact per unit distance of flight using methods known to the skilled person, taking account of current ambient conditions and also predicted ambient conditions over the expected lifetime of the contrail, including not only atmospheric conditions but also the albedo of the underlying surface or cloud partly shielded from sunlight by the contrail. The lifetime climate impact will take account of cooling aspects of the contrail as well as warming aspects.

The engine-specific or engine group-specific contrail climate impact is converted into an engine-specific or engine group-specific cost per unit distance of flight using a metric or exchange rate which assigns a financial value to the contrail climate impact. This may be based on calculating the contrail climate impact directly using methods known to the skilled person, and its value would be greater (corresponding to a higher cost) for a contrail which is more warming (or less cooling) and lower (corresponding to a lower cost) for a contrail which is less warming (or more cooling). The difference between the engine-specific or engine group-specific cost per unit distance of flight of the contrail for each combination of $\Delta F1$ and $\Delta T1$ and that of the contrail that would be formed with $\Delta F1$ and $\Delta T1=0$ is then determined.

The engine-specific or engine group-specific cost of additional fuel per unit distance of flight of each combination of $\Delta F1$ and $\Delta T1$ (relative to the fuel cost for $\Delta F1$ and $\Delta T1=0$) is then calculated in step 404b, including the cost of carrying the extra fuel to the proposed location of use. Note that for some engines 3a, 3b, 5a, 5b or engine groups 3, 5, this cost could be negative due to reductions in fuel flow rate applied.

At step 404c, the engine-specific or engine group-specific additional climate impact of carbon dioxide related to the additional fuel burn is calculated and converted into an additional carbon dioxide cost using a suitable metric or exchange rate which assigns a financial value to the climate impact. This may take into account, for example, costs levied per tonne of carbon dioxide generated, the cost of offsetting carbon dioxide emissions and/or other factors. This could also be negative for some engines 3a, 3b, 5a, 5b or engine groups 3, 5.

The engine-specific or engine group-specific overall additional cost (relative to nominal operation) per unit distance of flight is the sum of the engine-specific or engine group-specific additional contrail cost, carbon dioxide cost and fuel cost. Optionally the summation may be weighted to increase or decrease the relative significance of one or more individual sources of cost relative to an equal weighting summation. The sum of the engine-specific or engine group-specific overall additional cost per unit distance of flight over all engines or engine groups on the aircraft is determined in step 404d to give a total additional cost per unit distance of flight for the entire aircraft 1.

For some combinations of first-engine-group-choice, $\Delta F1$ and $\Delta T1$, the additional contrail cost at the aircraft level will be negative to an extent that it exceeds the aircraft-level positive additional carbon dioxide cost and the aircraft-level positive additional fuel cost, leading to a negative value for the overall additional cost per unit distance of flight. This would therefore provide an overall benefit in cost (or contrail formation) for the whole aircraft 1.

In order to implement the chosen parameters in step 408, the control and decision making unit 25 sends the following instructions:

To the controller 136 of each electrical machine of each engine in the second group implementing the required electrical off-take.

To the controller 136 of each electrical machine of each engine in the first group implementing the required electrical assistance.

To the controller 132 of each engine in the first group, implementing the modified thrust $T_N+\Delta T1$ (as discussed above, this may be a thrust signal, a fuel flow parameter, or any other signal).

To the controller 132 of each engine in the second group, implementing the modified thrust $T_N+\Delta T2$ (as discussed above, this may be a thrust signal, a fuel flow parameter, or any other signal)

Where the engine controllers 132 receive a thrust signal, the engine controller 132 determines the necessary fuel flow to achieve and/or maintain the requested thrust level (or proxy therefor), taking account of the effect of the implemented electrical power offtake or electrical assistance, using conventional engine control methods. Alternatively, this may be determined at the control and decision-making unit 25 and sent to the engine controllers 132.

Implementation of the chosen parameter values at each engine may not happen instantaneously, since it takes non-zero time to move from the current values of $\Delta F1$, $\Delta T1$, $\Delta F2$ and $\Delta T2$ and the like to the desired values. Delays may be caused principally by the time taken for the rotational speeds of the spools of an engine 3a, 3b, 5a, 5b, 100, 200 to respond to a change in fuel flow rate and/or to a change in the torque or power of an electric motor/generator 134. Delays may be different for different spools of the engine and may be different for fuel flow rate adjustments than for adjustments in electrical power offtake/electrical assistance.

Accordingly, a trajectory is defined for each parameter from its pre-adjustment value to its post-adjustment value. The trajectory for each parameter may include intermediate waypoints, the number of waypoints being the same for all parameters undergoing adjustment. The waypoints are defined to ensure that the overall thrust provided to the aircraft remains constant throughout the transition. The adjustment for each parameter may be conducted in steps, each step corresponding to the transition from one waypoint to the next waypoint on the trajectory for that parameter. The next step may only be performed if all other parameters have reached the current waypoint and are ready to make the step to the next waypoint. Using this method prevents changes attributable to adjustments in one parameter from getting substantially ahead or behind changes attributable to adjustments in one or more further parameter and avoids or reduces momentary changes in the thrust delivered to the aircraft.

An alternative approach is to set a predetermined rate limit for each parameter which would prevent adjustments for that parameter from proceeding at a rate exceeding the rate limit. The predetermined rate limit for each parameter would be set so that adjustments for all parameters proceed at a rate corresponding to that of the slowest-responding parameter.

The method 400 may be repeated throughout a flight mission or part of a flight mission. In one example, the method 400 may be repeated continuously, such that it restarts at step 402 as soon as it is completed at step 408.

Alternatively, the method may be repeated after the parameters determined from the previous iterations have been implemented. In further examples, the repetition of the method may be time based, at regular interval (for example every minute, every ten seconds, every second). In yet another example, the calculation may be repeated in response to a sensed material change in conditions (requested thrust level, ambient temperature, ambient humidity, ambient pressure, forecasted future ambient conditions, time of day).

Optionally a threshold may be applied such that if the additional cost of the selected action (the selected combination of $\Delta F1$ and $\Delta T1$) is insufficiently negative, it is not implemented and instead operation is carried out according to previously determined nominal thrust and fuel flows (i.e. $\Delta F1$, $\Delta T1$, $\Delta F2$ and $\Delta T2=0$) until such time as a sufficiently cost-negative action becomes available.

Optionally, the method 400 shown in FIG. 5 may include the initial step of determining which engine group is the first engine group. This may be based on heuristic learning, look up tables or other suitable models. This reduces the number of combinations of $\Delta F1$ and $\Delta T1$ that are searched in the method 400 of FIG. 5.

Optionally, the method 400 may employ various search strategies in order to identify a combination of $\Delta F1$ and $\Delta T1$ to use. For example, a first search may be carried out across the full possible ranges of $\Delta F1$ and $\Delta T1$, with a first spacing between values of $\Delta F1$ and $\Delta T1$. Then a second search, with smaller spacing between $\Delta F1$ and $\Delta T1$ may be carried out in a sub-range identified by the first search.

Other search strategies may also be employed. For example, $\Delta F1$ and $\Delta T1$ may be continuously variable between the upper and lower boundaries and various search strategies may be employed to search over the parameter space to find either a global optimal result or a local optimal result that is acceptable for use.

Figure 6:
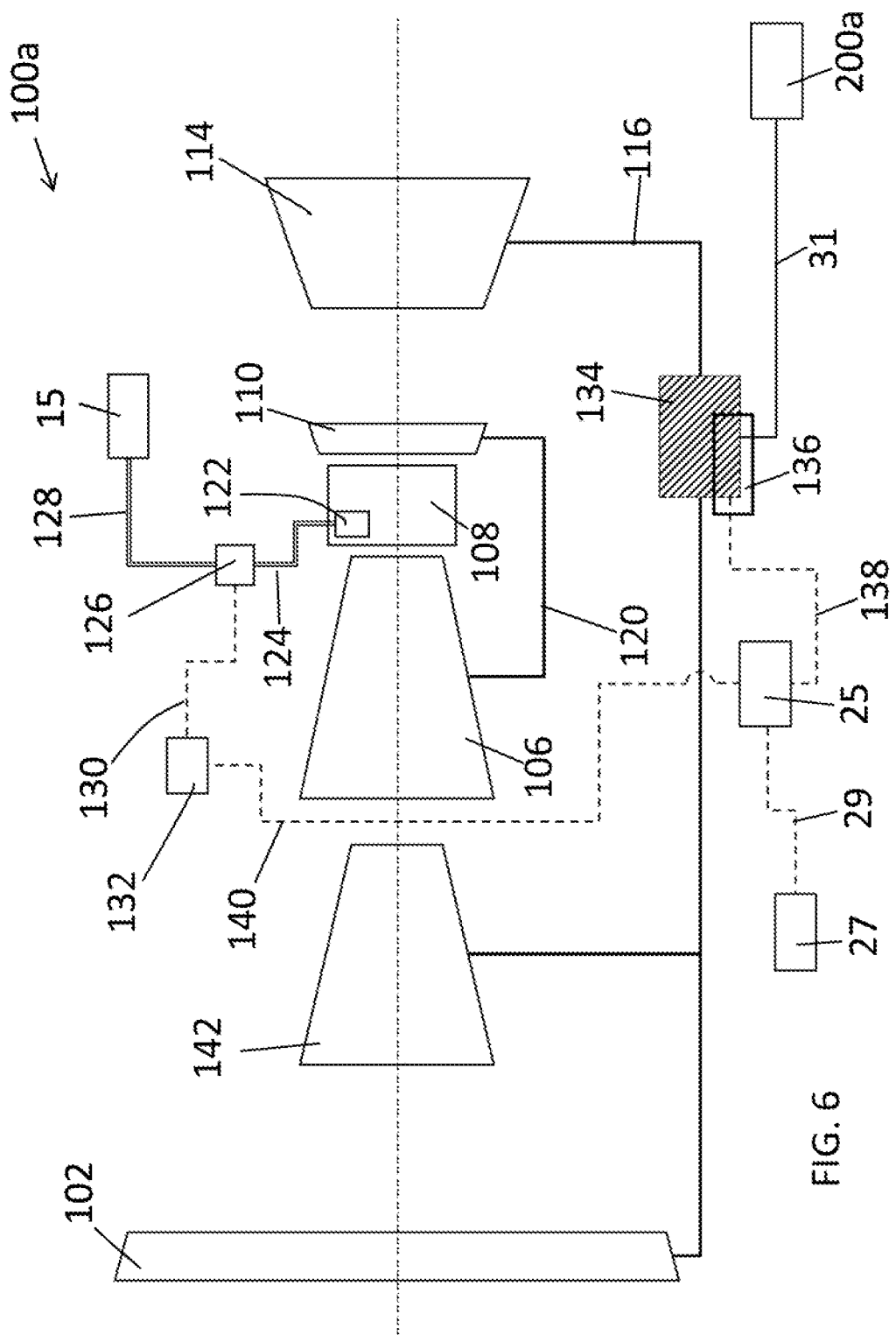
FIGS. 6 and 7 are schematic illustrations of alternative engines for use in the propulsion system of FIG. 1.
Figure 7:
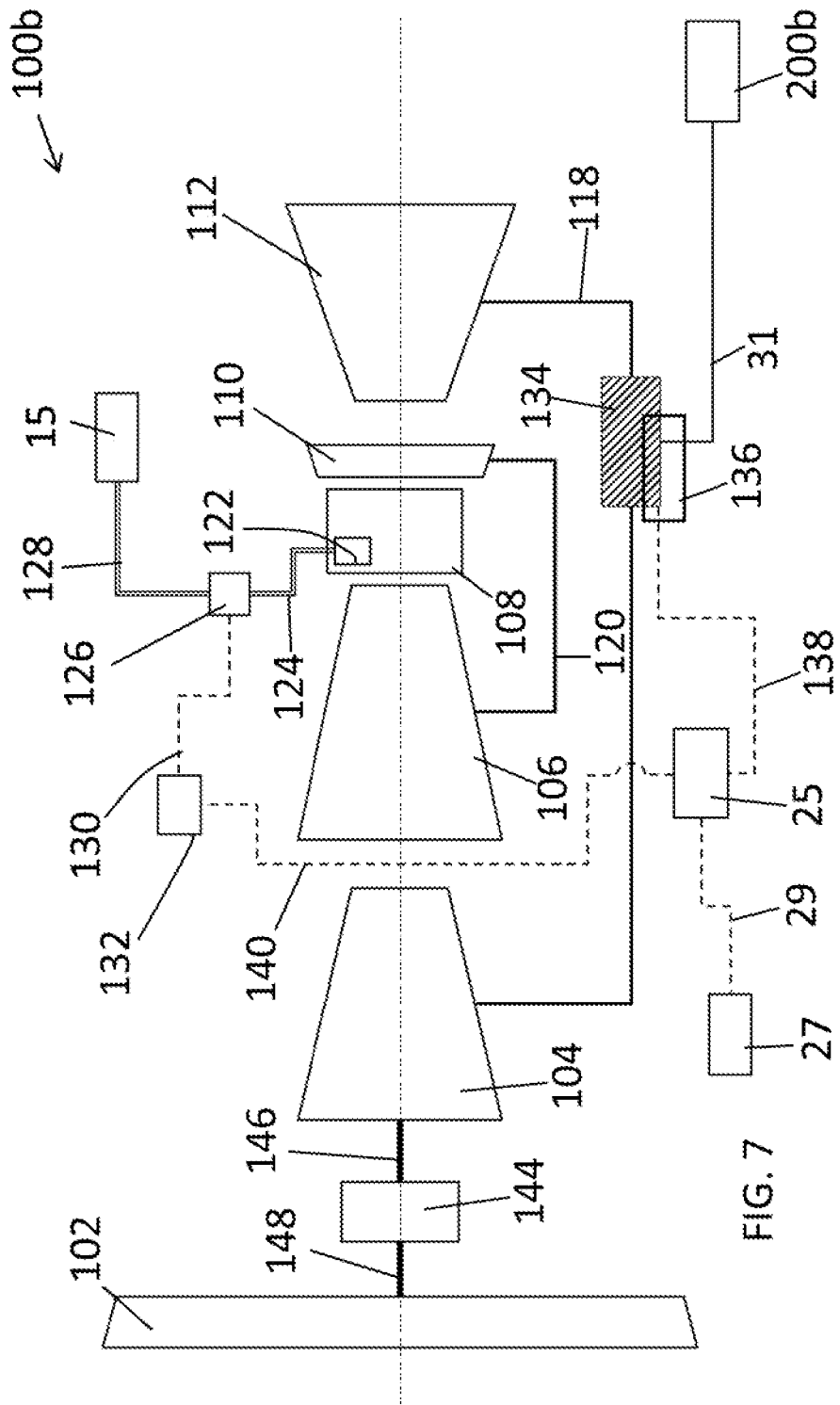

The engine configuration shown in FIG. 2 is given by way of example only. FIGS. 6 and 7 show alternative examples of engines 100a, 100b that may be used in the propulsion system discussed above. Where the engines 100a, 100b of FIGS. 6 and 7 include the same features as the three-spool engine 100 of FIG. 2, the same reference numbers are used.

FIG. 6 shows an example of a two-spool engine 100a. The two-spool engine 100a includes, in axial flow series, a propulsive fan 102, a booster compressor 142, a high-pressure compressor 106, a combustor 108, a high-pressure turbine 110, and a low-pressure turbine 114.

The low-pressure turbine 114 is drivingly connected via shaft 116 to the propulsive fan 102 and the booster compressor 142. The high-pressure turbine 110 is drivingly connected via shaft 120 to the high-pressure compressor 106.

The combustor 108 comprises one or more fuel injectors or fuel spray nozzles 122 which receives fuel via fuel supply pipe 124 at a rate governed by fuel pump or fuel flow regulator 126 which draws fuel from, or passes fuel received from, one or more fuel tank 15 via one or more fuel supply pipe 128 in dependence upon a fuel flow rate signal received via signal communication link 130 from an engine controller 132.

Collectively, the fan 102, the booster compressor 142, the low-pressure turbine 114, the shaft 116 connecting these components, and any other components such as the nose cone which are obliged to rotate at the same rotational speed as the low-pressure turbine 114 are referred to as the low-pressure spool. The speed of rotation of the low-pressure spool is typically denoted N1.

Collectively, the high-pressure compressor 106, high-pressure turbine 110, the shaft 120 connecting the two, and any other components which are obliged to rotate at the same rotational speed as the high-pressure turbine 110 are referred to as the high-pressure spool. The speed of rotation of the high-pressure spool is typically denoted N3.

FIG. 7 illustrates a geared engine 100b. The geared engine 100b includes, in axial flow series, a propulsive fan 102, a power gearbox 144, an intermediate-pressure compressor 104, a high-pressure compressor 106, a combustor 108, a high-pressure turbine 110, and an intermediate-pressure turbine 112.

The intermediate-pressure turbine 112 is drivingly connected via shaft 118 to the intermediate-pressure compressor 104. The high-pressure turbine 110 is drivingly connected via shaft 120 to the high-pressure compressor 106. The intermediate-pressure compressor 104 drives the power-gearbox 144 either directly or via an optional shaft 146, while the power-gearbox 144 drives the propulsive fan 102 either directly or via an optional shaft 148.

The combustor 108 comprises one or more fuel injectors or fuel spray nozzles 122 which receives fuel via fuel supply pipe 124 at a rate governed by fuel pump or fuel flow regulator 126 which draws fuel from, or passes fuel received from, one or more fuel tank 15 via one or more fuel supply pipe 128 in dependence upon a fuel flow rate signal received via signal communication link 130 from an engine controller 132.

Collectively, the fan 102, optional shaft 148, part of the power gearbox 144, and any other components such as the nose cone which are obliged to rotate at the same rotational speed as the fan 102 are referred to as the low-pressure spool. The speed of rotation of the low-pressure spool is typically denoted N1.

Collectively, a further part of the power gearbox 144, the optional shaft 146, the intermediate-pressure compressor 104, intermediate-pressure turbine 112, the shaft 118 connecting the two, and any other components which are obliged to rotate at the same rotational speed as the intermediate-pressure turbine 112 are referred to as the intermediate-pressure spool. The speed of rotation of the intermediate-pressure spool is typically denoted N2.

Collectively, the high-pressure compressor 106, high-pressure turbine 110, the shaft 120 connecting the two, and any other components which are obliged to rotate at the same rotational speed as the high-pressure turbine 110 are referred to as the high-pressure spool. The speed of rotation of the high-pressure spool is typically denoted N3.

The total temperature (or stagnation temperature) of air exiting the combustor 108 is typically denoted T40 for the engines 100a, 100b shown in both FIGS. 6 and 7.

In a similar manner to the three-spool engine 100, an electrical machine 134 is attached to the low-pressure spool of the engine 100a, shown in FIG. 6. This electrical machine 134 can provide electrical assistance to the low-pressure spool or act as a generator driven by the low-pressure spool. As with the three-spool engine 100, an electrical transmission connection 31 is provided to allow power transfer from the engine 100a of FIG. 6 to one or more further engine 200a, and/or from the one or more further engine 200a to the engine 100a, to allow electrical power sharing between the low-pressure spool of the engine 100a and the low-pressure spool of the further engine 200a, and vice versa.

In the engine shown in FIG. 7, an electrical machine 134 is attached to the intermediate pressure spool. This electrical machine 134 can provide electrical assistance to the intermediate-pressure spool or act as a generator driven by the intermediate-pressure spool. Similarly, an electrical transmission connection 31 is provided to allow power transfer from the engine 100b of FIG. 7 to one or more further engine 200b, and/or from the one or more further engine 200b to the engine 100b, to allow electrical power sharing between the intermediate-pressure spool of the engine 100b and the intermediate-pressure spool of the further engine 200b, and vice versa.

In the engines of FIGS. 6 and 7, energy transmission along electrical transmission connection 31 will take place in only one direction at a time. The rates of energy transmission in either direction is variable. This is similar for all embodiments.

In the embodiments shown in FIGS. 6 and 7, the one or more further engine 200a, 200b is a member of the opposite engine group to the engine 100a, 100b. Therefore, if the engine 100a, 100b is one of the inboard engines 3a, 3b, then the further engine 200a, 200b will be one of the outboard engines 5a, 5b and if the engine 100a, 200a is one of the outboard engines 5a, 5b, then the further engine 200a, 200b will be one of the inboard engines 3a, 3b.

As discussed above, the control and decision-making unit 25 receives a signal or signals representing the required thrust level (or a proxy therefor) of a plurality of engines 3, 5 from the cockpit 27 via signal communication connection 29. Signal communication connection 140 is provided to allow the control and decision-making unit 25 to send signals to, and optionally to receive signals from, the engine controller 132 as described above in relation to the three spool engine 100.

The electrical machine 134 and its controller 136 are also in signal communication with the control and decision-making unit 25, via signal communication connection 138. The signal communication connections 138, 140 may be provided by either the inboard signal communication connection or outboard signal communication connection discussed above.

It will be appreciated that the engines 100a, 100b shown in FIGS. 6 and 7 may be used on the aircraft 1 shown in FIG. 1. The methods discussed in relation to FIGS. 4 and 5 may be applied using the engines 100a, 100b in FIG. 6 or 7 in place of the three spool engine 100, without any modification to the method or aircraft 1.

In the engines 100, 100a shown in FIGS. 2 and 6, the electrical machine 134 drives or is driven by the low-pressure spool. This is by way of example only. In other examples, the electrical machine may drive or be driven by any other spool of the engine 100, 100a, 100b. For example, FIG. 7 illustrates the electrical machine 134 driving or being driven by the intermediate-pressure spool. In yet further examples, there may be electrical machines 134a, 134b in multiple spools of the engine 100, 100a, 100b.

Figure 8:
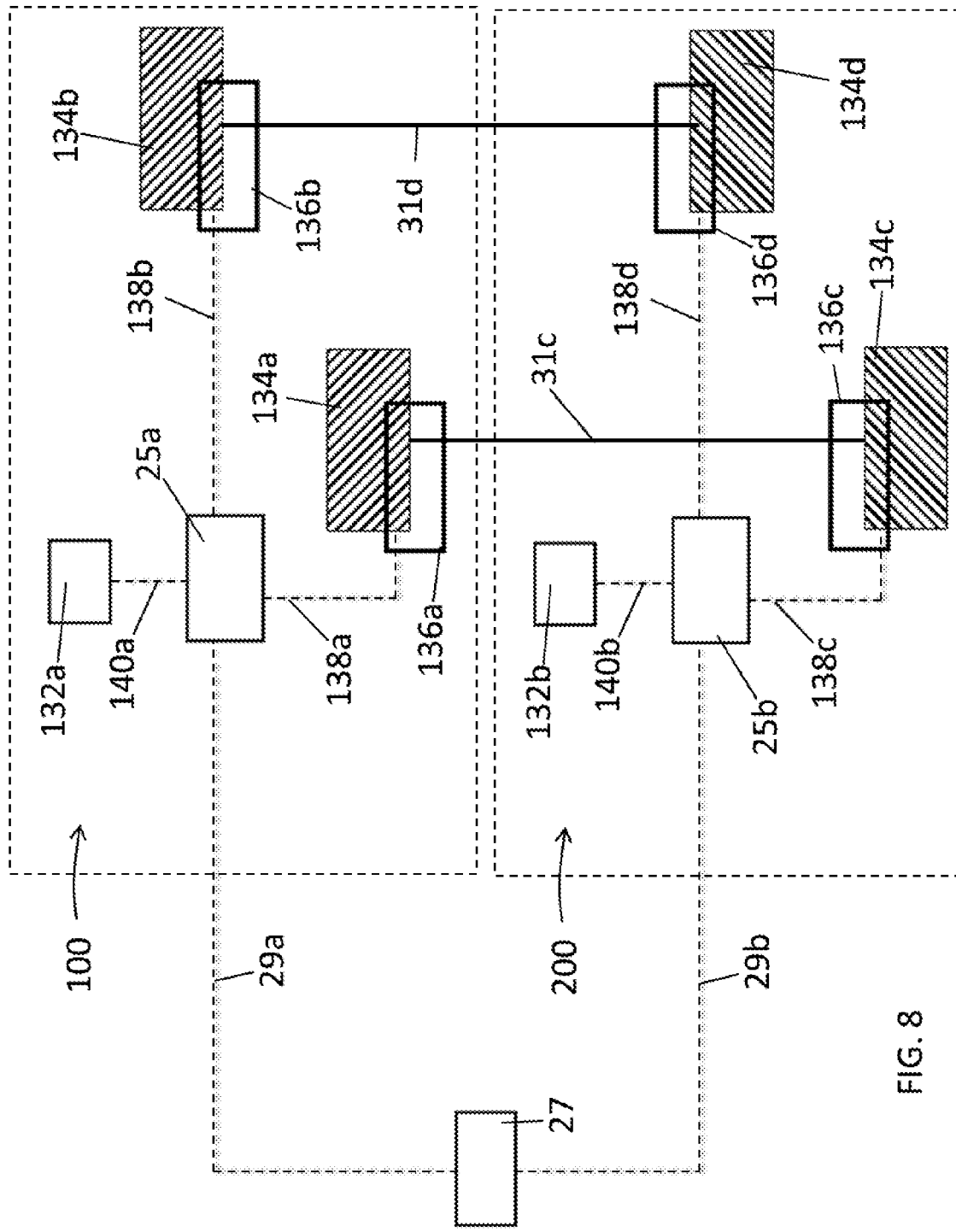
FIGS. 8 and 9 are schematic illustrations of alternative systems for electrical power sharing in the propulsion system of FIG. 1.
Figure 9:
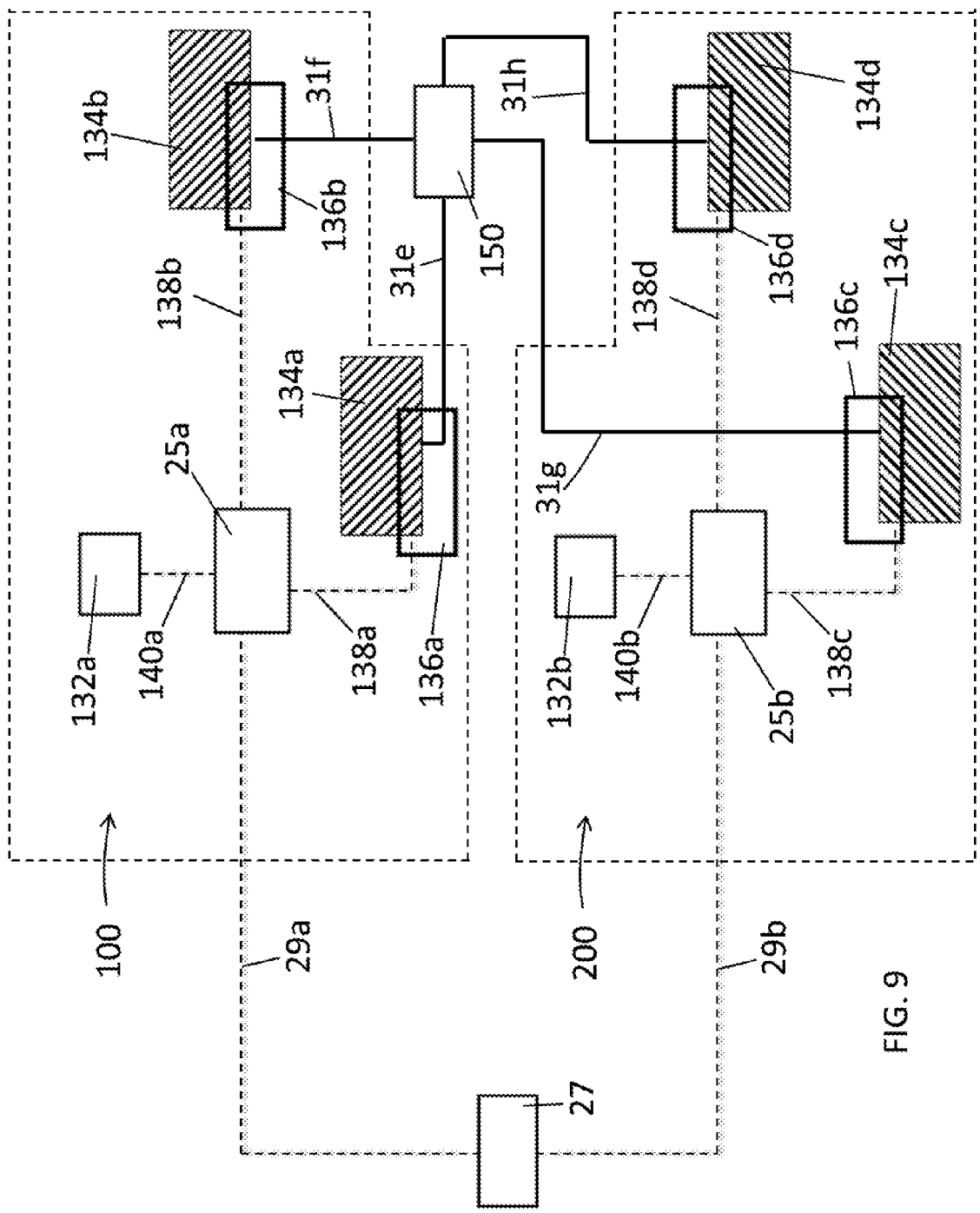

FIGS. 8 and 9 illustrate examples of engine systems having electrical machines 134a, 134b on two spools of the engine. FIGS. 8 and 9 show only the electrical connections and signal communication connections. In the following examples, it will be assumed that the engines 100, 200 are ungeared and thus comprise a low-pressure spool and a high-pressure spool. However, it will be appreciated that the systems in FIGS. 8 and 9 may be used in any of the above engine configurations.

In both FIGS. 8 and 9, a first electrical machine 134a, 134c is provided on the low-pressure spool of each engine 100, 200, and a second electrical machine 134b, 134d is provided on the high-pressure spool. Each electrical machine is provided with a corresponding controller 136a, 136b, 136c, 136d in a similar manner to the system discussed with respect to FIG. 2.

The first electrical machines 134a, 134c communicate with the respective control and decision making units 25a, 25b by respective signal communication connections 138a, 138c and the second electrical machines 134b, 134d communicate with the respective control and decision making units 25a, 25b by respective signal communication connections 138b, 138d.

The control and decision making units 25a, 25b communicate with the respective engine controllers 132a, 132b by signal communication connections 140a, 140b and with the cockpit 27 through signal communication connections 29a, 29b.

It will be appreciated that the control and decision making units 25a, 25b could be physically co-located or even combined into a single control and decision making unit 25, which communicates with the cockpit 27 through a single signal communication connection 29, as shown in FIG. 1.

In the system shown in FIG. 8, a first electrical transmission connection 31c connects the electrical machine 134a on the low-pressure spool of the first engine 100 to the electrical machine 134c on the low-pressure spool of the second engine 200. A second electrical transmission connection 31d connects the electrical machine 134b on the high-pressure spool of the first engine 100 to the electrical machine 134d on the high-pressure spool of the second engine 200.

The arrangement in FIG. 8 allows the low-pressure spool of the first engine 100 to receive electrical assistance from the low-pressure spool of the second engine 200, or provide electrical assistance to the low-pressure spool of the second engine, and allows the high-pressure spool of the first engine 100 to receive electrical assistance from the high-pressure spool of the second engine 200, or provide electrical assistance to the high-pressure spool of the second engine.

In the system shown in FIG. 9, a power sharing interface 150 is provided between the first engine 100 and the second engine 200. The electrical machine 134a on the low-pressure spool of the first engine 100 is connected to the power sharing interface 150 by a first electrical transmission connection 31e, the electrical machine 134b on the high-pressure spool of the first engine 100 is connected to the power interface 150 by a second electrical transmission connection 31f, the electrical machine 134c on the low-pressure spool of the second engine 200 is connected to the power sharing interface 150 by a third electrical transmission connection 31g, and the electrical machine 134d on the high-pressure spool of the second engine 200 is connected to the power sharing interface 150 by a fourth electrical transmission connection 31h.

The power sharing interface 150 is configured such that electrical power offtake from any spool of the first engine 100 with a corresponding electrical machine 134a, 134b need not be used to provide electrical assistance solely to the corresponding spool of the further engine 200 but could instead be used to provide electrical assistance to either or both of the spools with electrical machines 134c, 134d.

The interface 150 is further configured such that electrical assistance to any spool of the first engine 100 need not be sourced solely from the corresponding spool of the second engine 200, but could instead be sourced from either or both of the spools with electrical machines 134c, 134d of the second engine 200.

For an aircraft 1 at cruise conditions (well away from idle), where each engine includes electrical machines 134, there are a number of factors which are considered when controlling the operation of the propulsion system.

Taking power offtake from the high-pressure spool results in higher efficiency than taking power from the low-pressure spool, since taking power offtake from the high-pressure spool is likely to result in a requirement for a smaller amount of additional fuel flow rate to return to a nominal thrust setting, compared to electrical power offtake from the low-pressure spool.

However, if contrail enhancement, rather than contrail reduction, is deemed advantageous, then, for a fixed engine thrust level, taking electrical offtake from the low-pressure spool reduces the bypass mass flow and thus exerts a greater impact upon contrail factor than power offtake from the high-pressure spool.

Electrical assistance to the low-pressure spool is likely to result in a greater amount of additional thrust per MW of assistance compared to electrical assistance to the high-pressure spool and hence enables a greater reduction in fuel flow rate to return to a nominal thrust setting, due to the higher propulsive efficiency of bypass exhaust relative to core exhaust.

Electrical assistance to the low-pressure spool, when combined with fuel flow rate reductions, is likely to yield a larger reduction in contrail factor than electrical assistance to the high-pressure spool combined with the same fuel flow rate reductions at a constant thrust.

In cases where cross-spool power sharing is possible, as discussed with respect to FIG. 9, and where contrail reduction is deemed advantageous, and where power offtake from the high-pressure spool is preferable for efficiency reasons to power offtake from the low-pressure spool, then the per-engine high-pressure spool power offtake in the second engine group is set to a maximum value, the maximum value being determined with reference to the torque and/or power ratings of the electrical machine 134b, 134d, the power ratings of the power electronics, and any constraints imposed by operability requirements for engines of the second engine group.

Since engines of the second engine group are assumed identical to engines of the first engine group, the per-engine electrical power offtake from the high-pressure spool of engines in the second engine group will be greater than or equal to the per-engine electrical offtake required from the second engine group to fulfil the electrical assistance requirement of the high-pressure spools of the engines in the first engine group, which may be zero. This means that the per-engine low-pressure spool power offtake from engines in the second engine group will be correspondingly less than or equal to the per-engine electrical offtake required from the second engine group to fulfil the electrical assistance requirement of the low-pressure spools of the engines in the first engine group.

If cross-spool power sharing is possible, as discussed with respect to FIG. 9, and contrail enhancement is deemed advantageous, increases in contrail factor on engines of the second engine group may be prioritised over maximising efficiency of electrical power offtake from those same engines. Accordingly, high-pressure spool power offtake may be used to the minimum extent necessary.

The ability to provide electrical assistance to the high-pressure spool of engines in the first engine group, as shown in the systems of FIGS. 8 and 9, may for some engine architectures mean that the lower boundary of $\Delta F1$ could be more negative (corresponding to a greater reduction in fuel flow rate) without compromising surge margin of the low and/or intermediate-pressure compressors and/or booster compressor, thus enabling a wider envelope of operation.

The above examples are all discussed with reference to an aircraft 1 with four wing mounted engines 3a, 3b, 5a, 5b. It will be appreciated that this is by way of example. FIGS. 10 to 13 give further examples of aircraft 1a, 1b, 1c, 1d that may operate using the engines 100, 100a, 100b discussed above, and according to the methods 300, 400 set out in FIGS. 4 and 5. Where the aircraft of FIGS. 10 to 13 include the same features as the four engine aircraft 1 of FIG. 1, the same reference numbers are used.

Figure 10:
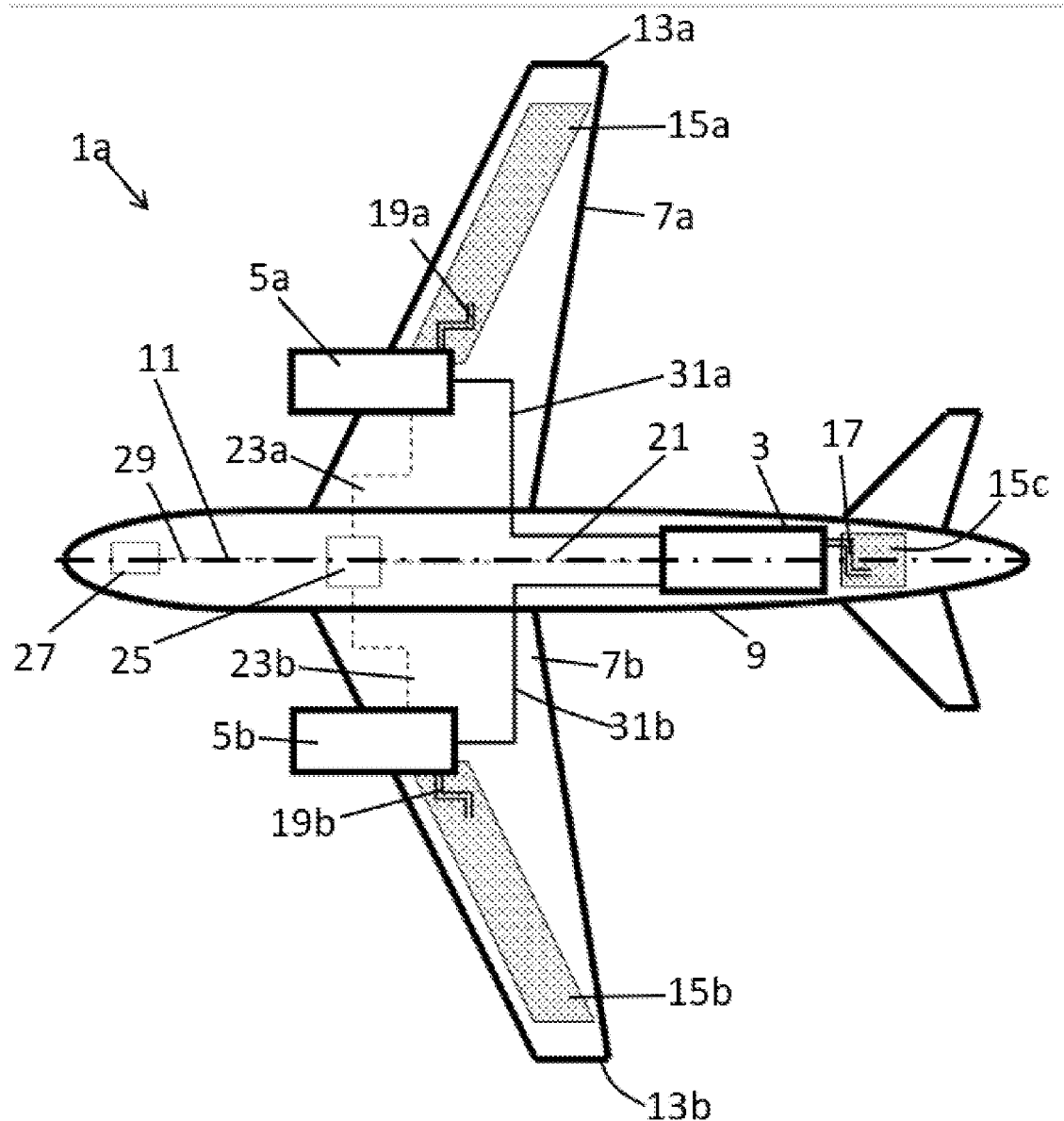
FIGS. 10 to 13 are schematic illustrations of alternative propulsion systems.

FIG. 10 shows a three-engine aircraft 1a, with otherwise substantially the same components as the aircraft 1 in FIG. 1. The aircraft comprises an engine 5a, 5b mounted under each wing 7a, 7b, and a fuselage mounted engine 3. It will be appreciated that the wing mounted engines 5a, 5b may be mounted at any suitable position along the wings 7a, 7b. For ease of illustration, the fuselage mounted engine 3 is shown drawing fuel from a dedicated fuel tank 15c in the tail of the aircraft 1a through fuel pipe 17. However, it is to be understood that other arrangements are contemplated.

In the case of aircraft 1a in FIG. 10, the fuselage mounted engine 3 is considered the inboard engine, while the wing-mounted engines 5a, 5b are considered the outboard engines even though they may be mounted at positions similar to the inboard engines of aircraft 1. The single inboard engine 3 is in communication with the control and decision making unit 25 through signal communication connection 21. Both outboard engines 5a, 5b share power with the single inboard engine through respective electrical transmission connections 31a, 31b.

Figure 11:
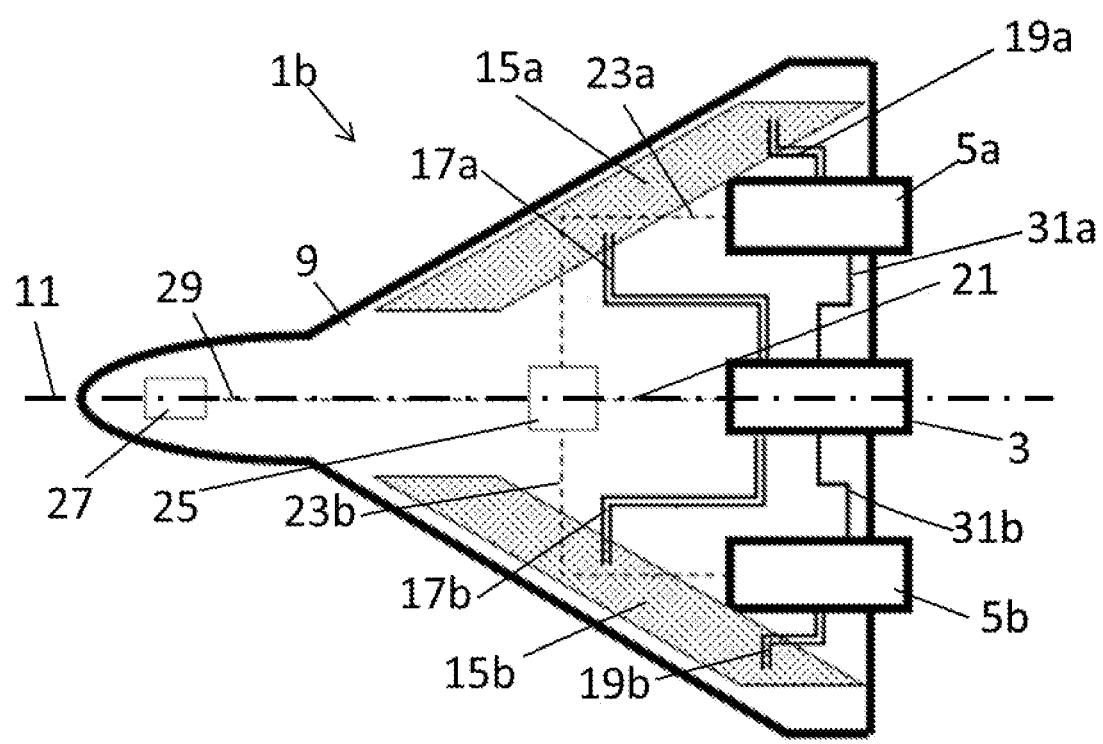

FIG. 11 shows a second example of an aircraft 1b with three engines. The aircraft 1b in FIG. 11 is a blended wing configuration. As such there is no distinct fuselage, wing or tail. An inboard engine 3 is mounted at the centreline 11 of the aircraft 1b, in-between two outboard engines 5a, 5b. The first outboard engine 5a draws fuel from a first fuel tank 15a through fuel pipe 19a, the second outboard engine 5b draws fuel from a second fuel tank 15b through fuel pipe 19b. For ease of illustration, the inboard engine 3 is shown drawing fuel through fuel pipes 17a, 17b from either or both of the main outboard tanks 15a, 15b, although it is to be understood that other fuel-system arrangements are contemplated, including an arrangement where the inboard engine draws fuel from a dedicated tank or tanks. The single inboard engine 3 is in communication with the control and decision making unit 25 through signal communication connection 21. Both outboard engines 5a, 5b share power with the single inboard engine through respective electrical transmission connections 31a, 31b.

Each of the aircraft 1a, 1b shown in FIGS. 10 and 11 may make use of any of the engines and methods discussed above.

Figure 12:
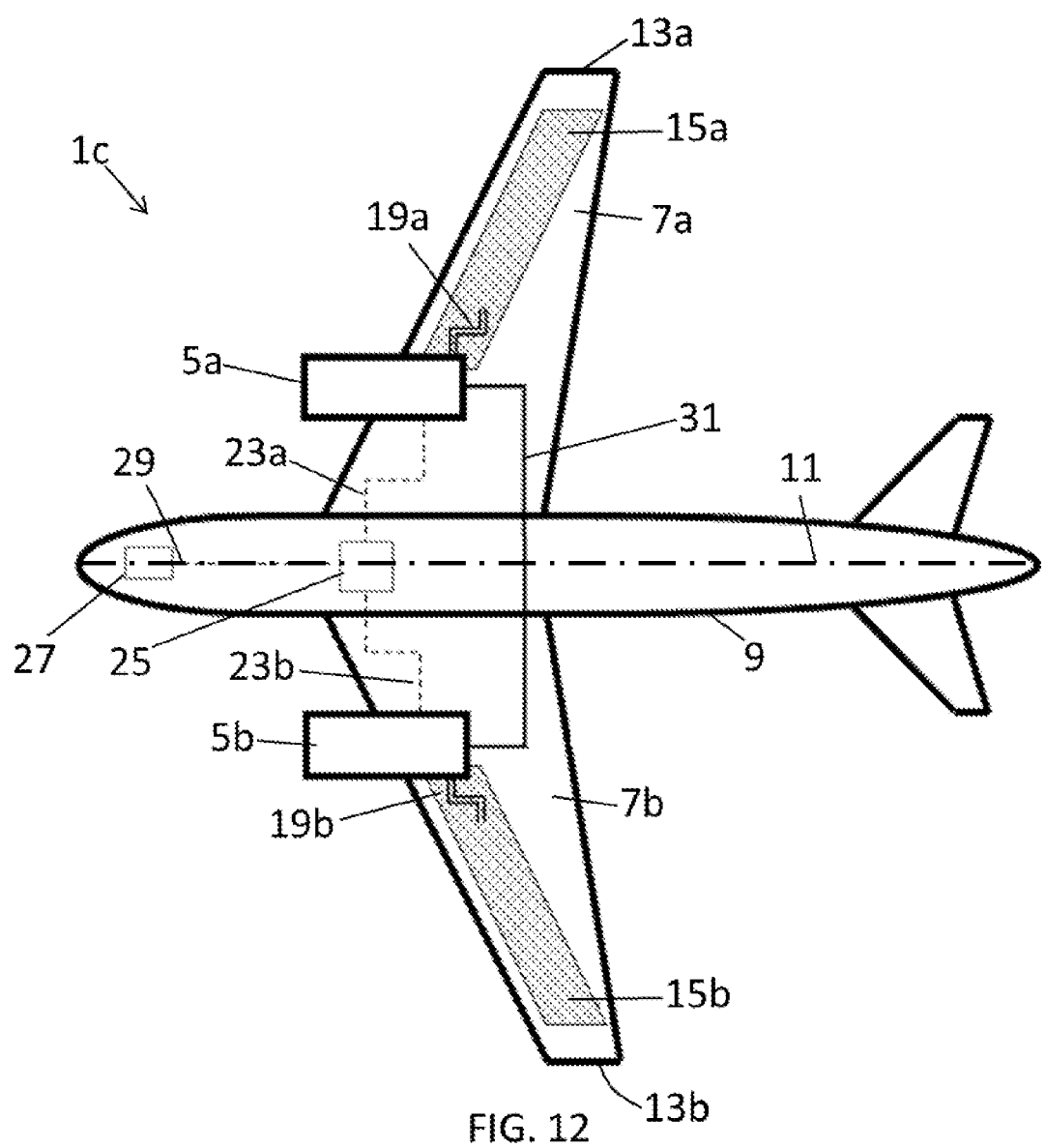

FIG. 12 shows an aircraft 1c with only two engines 5a, 5b mounted under the wings 7a, 7b. This configuration is similar to the one shown in FIG. 10, without the fuselage mounted engine 3. In this example, there is a single power sharing connection 31 between the two engines 5a, 5b.

Figure 13:
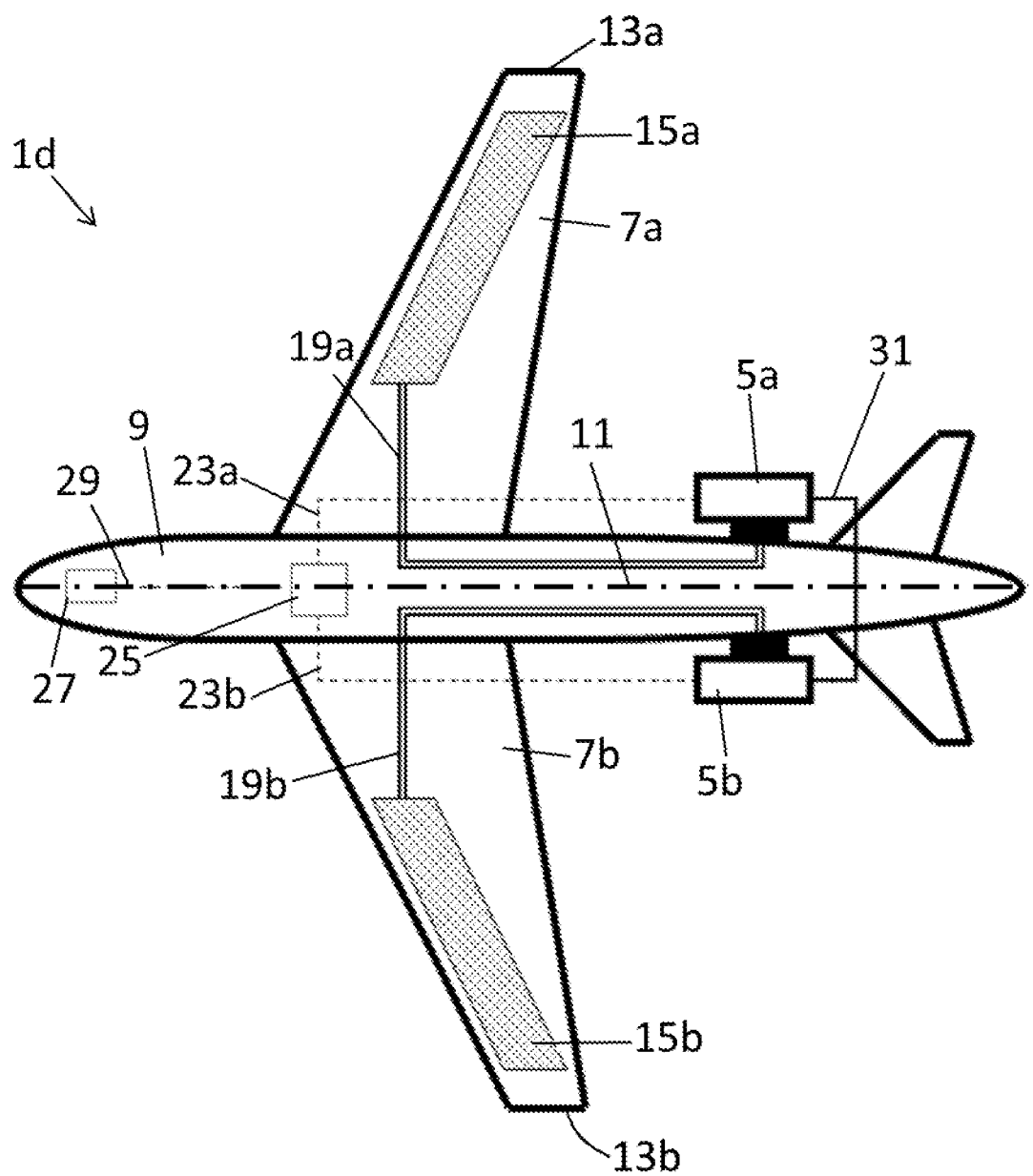

FIG. 13 shows a further example of an aircraft 1d with only two engines 5a, 5b. This is the same as the aircraft in FIG. 12, except the engines 5a, 5b are mounted on pylons attached to the fuselage 9 at the rear of the aircraft 1d.

In the aircraft 1c, 1d shown in FIGS. 12 and 13, there is no distinction between inboard and outboard engines. In this case, either engine may be assigned to the first engine group, with the other engine being assigned to the second engine group. The assignment of the groups is arbitrary, and so there is no need to perform any analysis of the combinations of $\Delta F1$ and $\Delta T1$ for setting both engines 5a, 5b as the first group. Instead, it is only necessary to perform the analysis with one of the engines 5a, 5b as the first group.

For aircraft configurations such as those shown in FIGS. 12 and 13, any of the engines and methods discussed above may be used. For the aircraft configurations shown in FIGS. 12 and 13, for which a change in the distribution of thrust between engine groups would result in a thrust asymmetry and thus a yaw moment about the yaw axis of the aircraft, $\Delta T1$ may be set to $\Delta T1=0$, as in the special case discussed above. This ensures there is no thrust asymmetry.

Various examples of operation of systems such as described above will now be discussed.

Example 1

In the first example, the ambient relative humidity over ice (RHI) is less than 100%.

Irrespective of other factors, if ambient air is not supersaturated with respect to ice then the methods discussed above are not carried out, because any contrail will be short lived and so any changes made will have little effect on the climate impact of the contrail. The engines of the aircraft are therefore operated at their respective nominal operating points.

Example 2

In example 2, it is assumed the aircraft 1 has a configuration as shown in FIG. 1, whilst the combustor 108 is of a rich burn type having nvPM # emissions as shown in FIGS. 3A and 3B, and operating in region A of FIGS. 3A and 3B. In example 2, ambient RHI is modestly over 100% (for example between 100% and 110%) and the maximum potential RHW when the exhaust mixes with ambient air is over 100% when operating all engines at their nominal operating points. It is assumed that ambient and operational conditions are such that contrail reduction (or elimination) is favoured.

In this example, inboard engines 3a, 3b would be assigned to the first engine group, and outboard engines 5a, 5b to the second engine group. Reduction of fuel flow rate of the inboard engines 3a, 3b, coupled with electrical assistance to the low-pressure spools of the engines will have the effect of reducing the proportion of emitted nvPM particles that become activated as condensation nuclei (except in very cold ambient conditions). In some cases this may limit the maximum value of RHW during the mixing of inboard engine exhaust with ambient air to values less than 100%, and thus may be sufficient to prevent inboard engine contrail formation altogether. Also on the inboard engines 3a, 3b, reduction of fuel flow rate reduces nvPM particle emissions per unit distance of travel, leading to a reduction in the number of potential condensation nuclei.

On the outboard engines 5a, 5b, an increase of fuel flow rate coupled with electrical power offtake from the low-pressure spools may increase the proportion of emitted nvPM particles that become activated as condensation nuclei (unless said proportion is already 100% or close to 100%). Depending on the extent to which the fuel flow rate to the second engine group 5a, 5b is increased, which depends on the extent to which fuel flow rate to the first engine group 3a, 3b is decreased, the outboard engine nvPM particle emission rate may remain in region A of FIGS. 3A and 3B, or may be move into region B, where the nvPM particle emissions rate may in some cases be reduced relative to the nominal value. Even if the outboard engine nvPM # emissions are increased, leading to a higher number of ice particles within the outboard engine contrails, the interaction of the exhaust with the wingtip vortex will moderate the extent of the post-vortex increase in ice particle number. In some cases (ambient ice-supersaturation only slightly above 100%) the outboard engine contrail could be substantially eliminated by the wingtip vortex interaction regardless of changes made to the nvPM particle emission number.

Example 3

In example 3, it is assumed that the aircraft 1d has the configuration shown in FIG. 13 and the combustor 108 is a lean-burn combustor operating in region F of FIG. 3C. Ambient RHI is above 100% and the maximum potential RHW when the exhaust mixes with ambient air is modestly over 100% when operating all engines at their nominal operating points. Ambient and operational conditions are such that contrail enhancement is favourable.

Since the engines 5a, 5b are positioned close to the aircraft centreline 11 it is assumed that the extent to which the engine exhaust is captured and retained within the wingtip vortices is relatively weak, and so wingtip vortex processing can be ignored for example 3.

There is no difference between the two engines 5a, 5b, and so one of them is arbitrarily assigned to the first engine group and the other to the second engine group.

In the engine assigned to the first engine group, a reduction of fuel flow rate causes the nvPM # to rise substantially due to a migration into the pilot-only regime of region D to the left of the staging point E in FIG. 3C. Due to a combination of fuel flow rate reduction and electrical assistance to the low-pressure spool, the proportion of emitted nvPM particles that become activated as condensation nuclei may be reduced. However, due to the very large increase in nvPM # associated with the transition from lean-burn to rich-burn mode, the net effect is to increase the number of ice particles formed.

In the engine assigned to the second engine group, an increase in fuel flow rate moves the engine further away from the staging point E, remaining in lean-burn mode in region F. There may be a small increase in nvPM # emissions but this will be negligible. However, due to the combination of increased fuel flow rate coupled with electrical power offtake, there will be an increase in the proportion of emitted nvPM particles that become activated as condensation nuclei.

As a result, contrails formed by both engines are enhanced due to an increase in the number of formed ice particles in their respective exhaust plumes.

Example 4

Example 4 is the same as example 3, except the aircraft configuration 1c shown in FIG. 12 is used, and the ambient RHI is at least 130%. Since the engines 5a, 5b are mounted further from the fuselage their exhausts are likely to interact more strongly with the wingtip vortices. In this example the same actions are taken as for example 3. The benefits could be larger however due to the contrail spreading effect of the wingtip vortex interaction, since due to the high ambient RHI, a high proportion of formed ice particles may survive the wingtip vortex interaction.

Example 5

For example 5 it is assumed that the aircraft 1a, 1b has the configuration shown in FIG. 10 or 11 (in which the inboard engine 3 is situated along the aircraft centreline 11). The combustor is of a rich-burn type as discussed with reference to FIGS. 3A and 3B, operating in region A. The ambient RHI is modestly above 100%, and the maximum potential RHW in the exhaust plume when operating all engines at their nominal operating points is also modestly above 100%. Conditions are such that contrail reduction or elimination is desired.

In this situation, it is not clear cut which engines 3, 5a, 5b should be assigned to the first group and which engines 3, 5a, 5b should be assigned to the second group. The methods discussed above can be used to identify whether it is preferable to have the inboard engine as the first group or second group. Examples 5a and 5b below discuss these two possibilities in turn.

Example 5a

In example 5a, the one inboard engine 3 is assigned to the first engine group while the two outboard engines 5a, 5b are assigned to the second engine group. This approach is motivated by the observation that (given the assumed modest level of ambient RHI) wingtip vortex processing may mitigate increases in outboard engine exhaust ice particle numbers to a greater extent than it may dilute reductions in inboard engine exhaust ice particle numbers. Furthermore, since there is only one inboard engine, the extent of reduction in the overall gradient of the mixing trajectory that can be achieved on that engine is (subject to inboard engine operability limits) substantially greater than could be achieved on the two outboard engines if the opposite engine-group assignment were to be made, and so there is a greater likelihood of achieving complete suppression of the inboard engine contrail without exceeding T40 limits on the second engine group.

On the inboard engine, a substantial reduction of fuel flow rate to the combustor coupled with a substantial amount of electrical assistance to the low-pressure spool (plus high-pressure spool electrical assistance as necessary to maintain acceptable booster/intermediate-pressure compressor surge margin) reduces the emission of nvPM particles and strongly reduces the peak RHW reached during mixing. Even if contrail suppression is not achieved, the number of formed ice particles may be substantially reduced.

On the outboard engines, a modest increase in per-engine fuel flow rate and a modest level of electrical power offtake means that the emission of nvPM particles is increased, leading to more formed ice particles. However this increase is moderated to some extent by wingtip vortex interaction as described above.

Example 5b

In example 5b, the two outboard engines 5a, 5b are assigned to the first engine group, and the one inboard engine 3 is assigned to the second engine group A large increase in fuel flow rate to the inboard engine would move it well into to region B of FIGS. 3A and 3B. Coupled with the substantial electrical power offtake from the low-pressure spool, a material rise in the overall gradient of the mixing trajectory could also be expected. Depending on the extent to which there is an increase in the proportion of emitted nvPM particles which become activated as condensation nuclei, this may or may not result in a disadvantageous increase of inboard engine contrail ice particles.

On both outboard engines, a reduction in nvPM # emissions (due to reduced fuel flow rate) and a reduction in the proportion of those emissions which become activated (due to reduced fuel flow rate in conjunction with electrical assistance to the low pressure spool) may be advantageously achieved.

The decision-making and control procedure set out above may identify which of the two approaches in example 5 is most favourable according to the details of the ambient conditions and engine operating points.

Example 6

In example 6 it is assumed that the aircraft 1a, 1b has the configuration shown in FIG. 10 or 11 (in which the inboard engine 3 is situated along the aircraft centreline 11). The combustor is of a rich-burn type as discussed with reference to FIGS. 3A and 3B, operating in region A. The ambient RHI is substantially above 100%, and the maximum potential RHW in the exhaust plume when operating all engines at their nominal operating points is below 100%. Conditions are such that contrail enhancement is desired.

This example illustrates a case in which a non-contrail formation condition may be turned into a contrail formation condition for at least one engine, and in which the wingtip vortex interaction results in a spreading/enhancement of outboard engine contrails (if formed). As with example 5, the inboard engine 3 may be assigned to the first group or the second group. Examples 6a and 6b discuss both options, in turn.

Example 6a

In example 6a, the inboard engine 3 is assigned to the first engine group and the outboard engines 5a, 5b to the second engine group. This causes an increase in the maximum RHW that can be reached in the outboard engine 5a, 5b exhaust plumes during mixing with ambient air. If the system is capable of sufficiently large adjustments in fuel flow rate and inter-engine electrical power transfer (which are limited by the fact that there is only one inboard engine 3), the outboard engines 5a, 5b may be moved to a contrail forming condition, and furthermore in the chosen ambient conditions the wingtip vortex interaction will further enhance the resulting contrail due to spreading.

Example 6b

Example 6b may be useful when it is not possible to make sufficiently large changes in order to move both outboard engines 5a, 5b to a contrail forming condition, and it may instead be possible to move the single inboard engine to a contrail forming condition. Although this would only move one engine, rather than two engines, to a contrail forming condition, and although the formed contrail may benefit less from the spreading effect of wingtip vortex interaction, nonetheless in the context of an example in which contrail enhancement is deemed advantageous, one contrail is preferable to no contrail.

In example 6b, the outboard engines 5a, 5b are assigned to the first engine group and the inboard engine 3 to the second engine group.

Example 7

In example 7, it is assumed that the aircraft 1a, 1b has the configuration shown in FIG. 10 or 11 (in which the inboard engine 3 is situated along the aircraft centreline 11). The combustor is of a rich-burn type as discussed with reference to FIGS. 3A and 3B, operating in region A. The ambient RHI is marginally above 100%, and the maximum potential RHW in the exhaust plume when operating all engines at their nominal operating points is below 100%. Conditions are such that contrail enhancement is desired.

This example illustrates a case in which a non-contrail formation condition can be turned into a contrail formation condition for at least one engine, and in which the wingtip vortex interaction results in partial elimination of outboard engine contrails.

Since in this example the wingtip vortex interaction works against contrail-enhancement actions aimed at the outboard engines 5a, 5b, in this circumstance it is preferable to target contrail creation to the inboard engine 3. Therefore, the outboard engines are chosen as the first engine group (fuel flow rate reduction, electrical assistance to the low-pressure shaft) and would thus be moved further into a non-contrail-forming condition.

The inboard engine 3 is assigned to the second engine group (fuel flow rate increase, electrical power offtake from the low-pressure spool), raising the overall gradient of the mixing trajectory in order to increase the maximum RHW achieved during mixing to a value above 100%, enabling contrail formation. Note that the achievable change on the single inboard engine 3 is greater than the change on the two outboard engines, due to the requirement for overall thrust to remain unchanged.

In the systems discussed above, aircraft 1, 1a, 1b, 1c, 1d having two, three or four engines are discussed. Aircraft configurations having more than four engines 3a, 3b, 5a, 5b may also be contemplated.

In one example, the method may still only consider two groups of engines (no matter the total number of engines): inboard engines and outboard engines. In such cases, each group may comprise more than two engines (or more than one engine on each wing).

In this case, each specific inboard engine may be connected to one specific outboard engine. This effectively duplicates the system shown in FIGS. 1 and 2. A separate control and decision making unit 25 may be provided for the first and second repeated systems. Alternatively, a single control and decision making unit 25 may be used. In another example, engines may be combined to form virtual engines, such that the method still effectively operates on a four engine system (one engine per group per wing).

In another example, more than two separate groups may be defined in the method.

In the systems and methods discussed above, it is assumed that the distribution of thrust within an engine group is even, so there is no thrust asymmetry across the central axis 11 of the aircraft 1, 1a, 1b. Furthermore, in some cases (corresponding to $\Delta T1=0$ and $\Delta T2=0$) the distribution of thrust between engine groups is unchanged relative to nominal operation, such that in those cases there is no thrust asymmetry across the central axis 11 of the aircraft 1c, 1d. However, this may not always be the case. Any thrust asymmetry caused by the methods discussed above, for any of the aircraft configurations discussed above, may be substantially smaller than that experienced during an engine-out condition which the aircraft is designed to handle. Therefore, some thrust asymmetry may be accommodated in certain situations. In order to limit thrust asymmetry, the available range within which the thrust distribution between engine groups may be altered could be substantially smaller than for aircraft configurations which maintain thrust symmetry. For example, the boundaries for $\Delta T1$ may be selected to avoid exceeding a maximum acceptable level of thrust asymmetry. The additional fuel-burn necessary to overcome rudder drag arising from correction of any thrust asymmetry may be incorporated in the costs discussed above. In some examples, the maximum acceptable level of thrust asymmetry may be substantially zero.

In the above systems and methods, the electrical assistance/offtake is evenly distributed within the engine group, but this need not be the case.

The accommodation of thrust asymmetry may also allow the above methods to be used where not all engines are operational.

In the systems and methods discussed above, a reduction in fuel flow rate to an engine is accompanied by a corresponding increase in electrical assistance, and an increase in the fuel flow rate is accompanied by an increase in electrical off-take. However, it will be appreciated that in some examples, electrical assistance may be provided from one engine group to another without any changes in the fuel flow rates. This will provide additional thrust at the engine group receiving the assistance and reduce thrust at the engine group providing the assistance.

It will be appreciated that the aircraft and engine configurations discussed above are given by way of example only. The methods may be applied to any configuration of engines on an aircraft, any engine type with any number of spools, and any suitable arrangement for sharing electrical power.

In the examples discussed above, one electrical machine is provided on each electrically enabled spool. However, it will be appreciated that a spool may have any number of electrical machines mounted on it in any suitable arrangement. Electrical machines may be mounted on any spool of the engine 3, 3a, 3b, 5a, 5b.

In one example, all engines 3, 3a, 3b, 5a, 5b on an aircraft are of the same type and configuration. In a further example, engines within the same group may be same configuration but engines within different groups may be of different configurations. In yet further examples, engines within the same group may have different configurations.

It will be appreciated that the order of the steps shown in FIGS. 4 and 5 is given by example only. The steps may occur in any suitable order.

What is claimed is:

1. An aircraft propulsion system comprising:
   at least two engines, each engine having: a propulsive fan and an engine core, the engine core comprising a compressor, a combustor and a turbine driven by a flow of combustion products from the combustor, the propulsive fan configured to generate a mass flow of air that bypasses the engine core to generate thrust;
   a first electrical machine coupled to a first engine, the first electrical machine arranged to be driven by electrical power in order to at least partially drive the first engine;
   a second electrical machine coupled to a second engine, the second electrical machine arranged to be driven by the second engine to generate electrical power;
   an electrical network arranged to allow transmission of electrical power between the first electrical machine and the second electrical machine; and
   a controller arranged to, based on expected properties of contrails formed in an exhaust plume of the first engine and/or second engine, selectively reduce fuel flow to the first engine, and provide electrical power from the second electrical machine to the first electrical machine, to drive the first electrical machine.

2. The aircraft propulsion system of claim 1, wherein the controller is arranged to selectively change fuel flow to the second engine concurrently with reducing the fuel flow to the first engine.

3. The aircraft propulsion system of claim 2, wherein the amount of electrical power provided to the first electrical machine and the change in fuel flow to the second engine is arranged to maintain the total thrust of the aircraft as unchanged.

4. The aircraft propulsion system of claim 2, wherein the controller is arranged to change the fuel flow to the second engine such that the thrust of the second engine remains unchanged, and wherein the electrical power provided to the first electrical machine causes the thrust of the first engine to remain unchanged, and optionally wherein the change in fuel flow to the second engine is either (i) of the opposite sign to the change in fuel flow to the first engine or (ii) is of the opposite sign and of a different magnitude to the change in fuel flow to the first engine.

5. The aircraft propulsion system of claim 2, wherein the thrust of the first and second engines is changed when the electrical power transfer occurs.

6. The aircraft propulsion system of claim 1, wherein the first and second engines are provided at different distances from a centreline of the aircraft, such that an exhaust plume of one of the engines is entrained in a wingtip vortex, to a greater degree than an exhaust plume of the other engine.

7. The aircraft propulsion system of claim 1, comprising three or more engines each having a corresponding electrical machine coupled to the engine, wherein the engines are arranged in groups, each group having one or more engine; and wherein the controller is arranged to, based on expected properties of contrails formed in exhaust plumes of engines in a first group of engines and/or engines in a second group of engines, selectively reduce fuel flow to the engines in the first group of engines, and provide electrical power from the electrical machines coupled to the engines in the second group of engines to the electrical machines coupled to the engines in the first group of engines, to drive the electrical machines coupled to the engines in the first group of engines to at least partially drive the engines in the first group of engines.

8. The aircraft propulsion system of claim 1, wherein each engine comprises one or more spools, and wherein the electrical machines are coupled to the same spool of each engine.

9. The aircraft propulsion system of claim 8, wherein the electrical machines are coupled to a first spool of each engine, the first spool arranged to rotate at a slower speed than at least one other spool, optionally wherein the first spool is arranged to rotate at a slower speed than any other spool.

10. The aircraft propulsion system of claim 8, wherein each engine comprises an electrical machine coupled to a first spool of the engine and an electrical machine coupled to a second spool of the engine.

11. The aircraft propulsion system of claim 1, wherein:
    the second electrical machine is arranged to be driven by electrical power in order to at least partially drive the second engine;
    the first electrical machine is arranged to be driven by the first engine to generate electrical power; and
    the controller is arranged to, based on expected properties of contrails formed in an exhaust plume of the first engine and/or second engine, either selectively reduce fuel flow to the first engine, and provide electrical power from the second electrical machine to the first electrical machine to drive the first electrical machine to at least partially drive the first engine; or selectively reduce fuel flow to the second engine, and provide electrical power from the first electrical machine to the second electrical machine to drive the second electrical machine to at least partially drive the second engine.

12. The aircraft propulsion system of claim 1, wherein the controller is arranged to:
    determine a cost function associated with each possible change of fuel flow and thrust of the first engine;
    select a combination of changes to fuel flow and thrust for the first engine; and
    control the propulsion system based on the selected combination of changes to fuel flow and thrust for the first engine.

13. The aircraft propulsion system of claim 12, wherein the controller is arranged to:
    for each possible change of fuel flow and thrust of the first engine, determine a corresponding change in fuel flow and thrust to the second engine, the corresponding change in fuel flow and thrust to the second engine incorporated in the cost function; and control the propulsion system based on the selected combination of changes to fuel flow and thrust for the first engine and the corresponding change in fuel flow and thrust to the second engine.

14. The aircraft propulsion system of claim 12, wherein the cost function includes one or more of:
   a cost associated with changes in contrail properties;
   a cost associated with extra fuel use; and
   a cost associated with changes to carbon dioxide emissions.

15. The aircraft propulsion system of claim 12, wherein the change in thrust for the first engine is set to zero, based on one or more of the aircraft configuration, ambient conditions and operating conditions.

16. The aircraft propulsion system of claim 1, wherein the controller is arranged to promote or reduce contrail formation in dependence on ambient and operational conditions.

* * * * *